US009173055B2

(12) United States Patent  
Ngo et al.

(10) Patent No.: US 9,173,055 B2  
(45) Date of Patent: Oct. 27, 2015

(54) MANAGING OF APPLICATION ACCESS TO CENTRALLY STORED PLACE-RELATED DATA ON A MOBILE DEVICE

(75) Inventors: Ngoc Bich Ngo, Ottawa (CA); Siamak Sartipi, Waterloo (CA); Jason Christopher Beckett, Kitchener (CA)

(73) Assignee: BlackBerry Limited, Waterloo, CA (US)

( * ) Notice: Subject to any disclaimer, the term of this patent is extended or adjusted under 35 U.S.C. 154(b) by 0 days.

(21) Appl. No.: 13/566,480

(22) Filed: Aug. 3, 2012

(65) Prior Publication Data  
US 2014/0038573 A1 Feb. 6, 2014

(51) Int. Cl.  
*G06F 3/048* (2013.01)  
*H04W 4/02* (2009.01)

(52) U.S. Cl.  
CPC ...................................... *H04W 4/02* (2013.01)

(58) Field of Classification Search  
CPC ........ H04M 3/16; H04W 12/00; G06F 3/048; G06G 99/00  
USPC ............ 455/410, 414.2; 705/1; 715/760, 781  
See application file for complete search history.

(56) References Cited

U.S. PATENT DOCUMENTS

| 7,103,420 | B2 | 9/2006 | Brown et al. |
| 7,912,837 | B2 | 3/2011 | Buron et al. |
| RE42,285 | E | 4/2011 | Anderson et al. |
| 7,925,272 | B2 | 4/2011 | Hjelm et al. |
| 8,250,096 | B2 | 8/2012 | Su et al. |
| 8,285,716 | B1 | 10/2012 | Srinivasaiah |
| 2003/0023726 | A1 | 1/2003 | Rice et al. |
| 2005/0108213 | A1 | 5/2005 | Riise et al. |
| 2005/0270311 | A1 | 12/2005 | Rasmussen et al. |
| 2006/0101005 | A1 | 5/2006 | Yang et al. |
| 2006/0141985 | A1* | 6/2006 | Patel et al. .................... 455/410 |
| 2006/0149734 | A1 | 7/2006 | Egnor et al. |
| 2006/0149742 | A1 | 7/2006 | Egnor |
| 2007/0198495 | A1 | 8/2007 | Buron et al. |
| 2008/0270366 | A1 | 10/2008 | Frank |
| 2009/0171686 | A1* | 7/2009 | Eberstadt ......................... 705/1 |

(Continued)

FOREIGN PATENT DOCUMENTS

| DE | 202013000058 U1 | 2/2013 |
| EP | 2348423 A2 | 7/2011 |
| WO | 2009151928 A2 | 12/2009 |
| WO | 2011053909 A1 | 5/2011 |
| WO | 2013084032 A1 | 6/2013 |

OTHER PUBLICATIONS

International Search Report dated Oct. 15, 2013 from related PCT application No. PCT/CA2013/000668.

(Continued)

*Primary Examiner* — Myron K Wyche  
(74) *Attorney, Agent, or Firm* — Moffat & Co.

(57) ABSTRACT

A method of managing place data for a mobile device, the method comprising storing place data for a place in a centralized place database and receiving input to specify which one or more applications on the mobile device are to have access to the place data for the place. In response to a place data request from a data-requesting application executing on the mobile device, the device determines if the data-requesting application has access to the place data for the place and provides the place data to the data-requesting application only if the data-requesting application has access. This technology enables the device to control the sharing of place data among applications on the device.

20 Claims, 25 Drawing Sheets

(56) References Cited

U.S. PATENT DOCUMENTS

| | | |
|---|---|---|
| 2009/0240564 A1 | 9/2009 | Boerries et al. |
| 2009/0241040 A1* | 9/2009 | Mattila et al. ............... 715/760 |
| 2009/0282003 A1 | 11/2009 | Hirata |
| 2010/0331016 A1 | 12/2010 | Dutton et al. |
| 2011/0099525 A1* | 4/2011 | Krysiuk et al. ............... 715/849 |
| 2011/0105143 A1 | 5/2011 | Harple et al. |
| 2011/0289433 A1 | 11/2011 | Whalin et al. |
| 2012/0011167 A1 | 1/2012 | Schmidt |
| 2012/0042036 A1 | 2/2012 | Lau et al. |
| 2012/0110458 A1 | 5/2012 | Brown et al. |
| 2012/0290977 A1 | 11/2012 | Devecka |
| 2012/0290979 A1 | 11/2012 | Devecka |
| 2013/0019185 A1 | 1/2013 | Zhang |
| 2013/0058632 A1 | 3/2013 | Jackson |
| 2013/0065613 A1 | 3/2013 | Stopel et al. |
| 2013/0152215 A1* | 6/2013 | Khosravy et al. ............... 726/28 |

OTHER PUBLICATIONS

European Search report from related EP application No. 12179322.8 dated Apr. 5, 2013.

European search report from related EP application 12006307.7 dated Dec. 12, 2012.

European search report from related EP application 112179321.0 dated Mar. 15, 2013.

European search report from related EP application 12182694.5 dated Apr. 24, 2013.

EP 2706496 (English) which corresponds to cited DE 202013000058.

European Search Report dated Oct. 14, 2014 which issued on related EP Application No. 14183399.6.

European Office Action dated Oct. 29, 2014 which issued on related EP Application No. 12006307.8.

United States Office Action dated Nov. 20, 2014 which issued on related U.S. Appl. No. 13/744,946.

United States Office Action dated Dec. 4, 2014 which issued on related U.S. Appl. No. 14/044,225.

United States Office Action dated Jan. 8, 2015 which issued on related U.S. Appl. No. 13/745,123.

Canadian Intellectual Property Office, Office Action, Application No. 2822633, Jan. 30, 2015.

European Patent Office, Office Action on Application No. 12179322.8, Issued on Jun. 10, 2015.

* cited by examiner

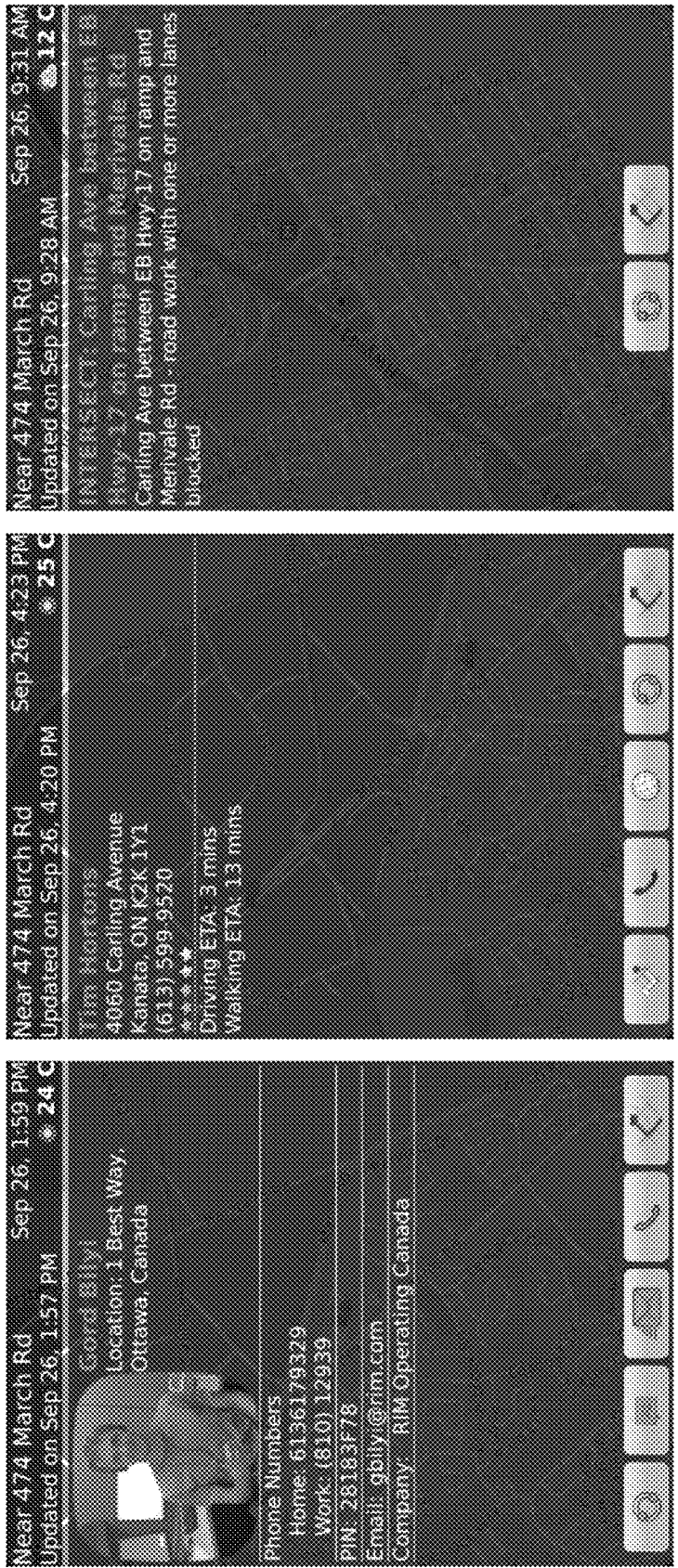

MANAGING OF APPLICATION ACCESS TO CENTRALLY STORED PLACE-RELATED DATA ON A MOBILE DEVICE

CROSS-REFERENCE TO RELATED APPLICATIONS

This is the first application filed for the present technology.

TECHNICAL FIELD

The present technology relates generally to mobile devices and, in particular, to location-based services for mobile devices.

BACKGROUND

Mobile devices or wireless communications device may offer location-based services (LBS). In a traditional paradigm, each application on the device that utilizes location data (e.g. maps, calendar, address book, instant messaging, etc.) stores its own location data. This redundant data is not only duplicated on the device but techniques for sharing of this data across applications are presently quite limited. Improvements on the foregoing are thus highly desirable.

BRIEF DESCRIPTION OF THE DRAWINGS

Further features and advantages of the present technology will become apparent from the following detailed description, taken in combination with the appended drawings, in which:

FIG. 17a depicts a place view for a contact;

FIG. 17b depicts a place view for a coffee shop;

FIG. 17c depicts a place view for an intersection, showing a traffic update;

It will be noted that throughout the appended drawings, like features are identified by like reference numerals.

DETAILED DESCRIPTION

Figure 1:
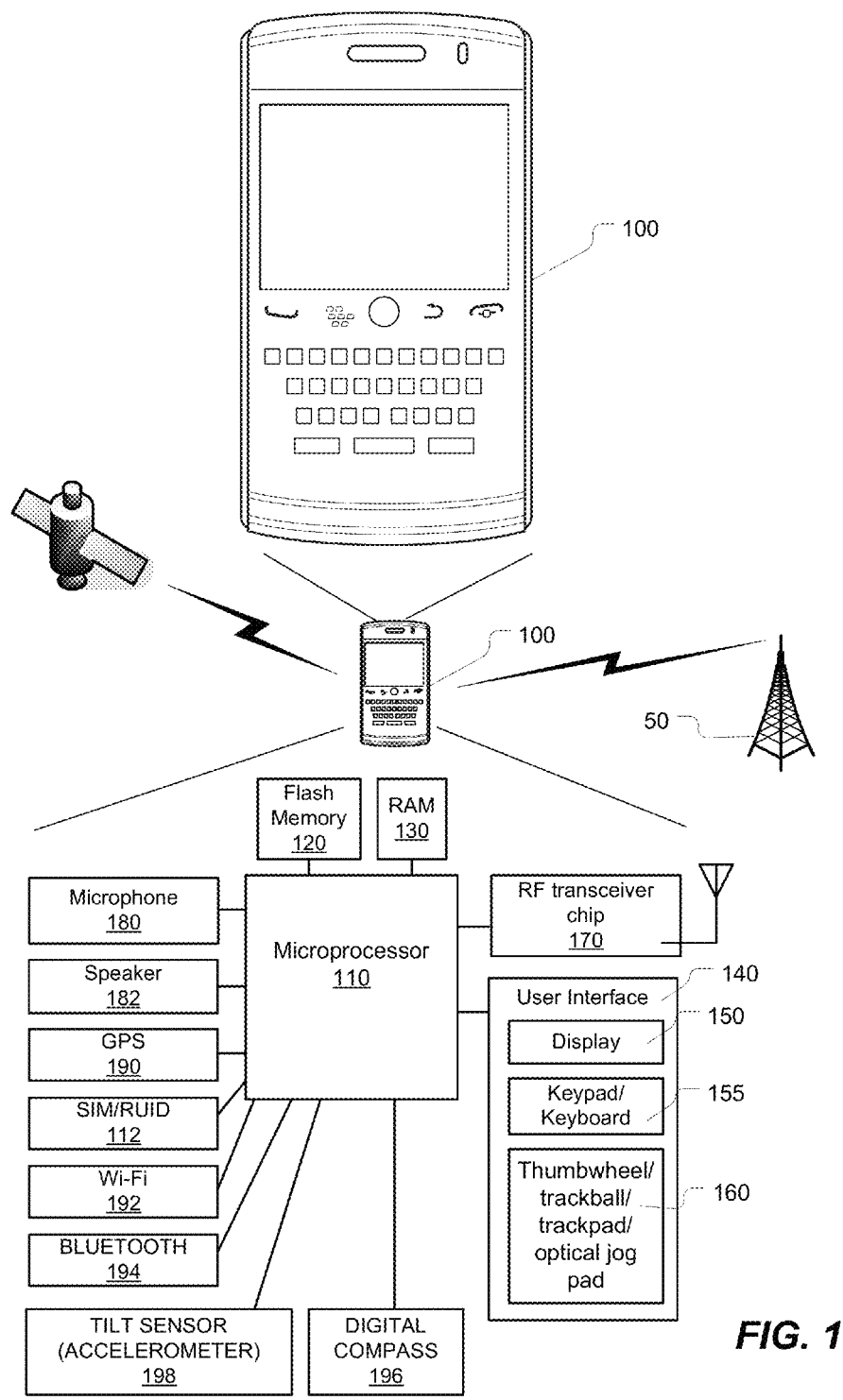
FIG. 1 is a depiction of a mobile device on which the present technology may be implemented, the depiction including a schematic depiction of some components of the mobile device.

The present technology provides a novel system and method that implements a novel place data paradigm for managing, using and presenting place data. Dispensing with the conventional data silos for place or location data on a device, the present technology creates a centralized place database on or accessible by the device so that all applications that utilize place data can obtain the place data from this centralized location database. This technique ensures that the place data is used, presented and managed in a consistent manner. It also permits place data to be shared with an efficiency and ease that was not previously possible. The centralized place database furthermore collects, aggregates, and collates place-related information and content for each place specified by the user or identified by the device. This collation of place data centralizes and consolidates all of the place-related information and content for a given place. This place-centric paradigm enables the device to present to the user all of the relevant content for a specific place. The device may thus present, in one view, content that would otherwise be viewable only through each separate applications: meetings, tasks, events, news, weather, etc. that occur at or near the place, or which have some relevancy or connection to the place. Specifically, the present technology enables the user to manage the sharing of place data among applications running on the mobile device.

Accordingly, one aspect of the present technology is a method of managing place data for a mobile device. The method involves receiving input to select a place, receiving input to specify which one or more applications on the mobile device are to have access to the place data for the place, storing the place data for the place in a centralized place database and, in response to a place data request from a data-requesting application executing on the mobile device, determining if the data-requesting application has access to the place data for the place and providing the place data to the data-requesting application only if the data-requesting application has access.

Another aspect of the present technology is a computer-readable medium comprising instructions in code which when loaded into a memory and executed by a processor of a mobile device cause the mobile device to receive input to select a place, to receive user input to specify which one or more applications on the mobile device are to have access to the place data for the place, to store the place data for the place in a centralized place database and, in response to a place data request from a data-requesting application executing on the mobile device, determine if the data-requesting application has access to the place data for the place and provide the place data to the data-requesting application only if the data-requesting application has access.

Another aspect of the present technology is a mobile device having a position-determining subsystem for determining a position of the mobile device, a user interface for receiving input to select a place and then to specify which one or more applications on the mobile device are to have access to the place data for the place, a memory for storing the place data for the place in a centralized place database, and a processor for processing a place data request from a data-requesting application executing on the mobile device by determining if the data-requesting application has access to the place data for the place and providing the place data to the data-requesting application only if the data-requesting application has access.

The details and particulars of these aspects of the technology will now be described below, by way of example, with reference to the drawings.

FIG. 1 is a depiction of a wireless communications device as one example of a mobile device that may be used to implement this novel technology. Examples of a mobile device or wireless communications device include cell phones, smart phones, mobile phones, portable digital assistants, or any other such portable or handheld electronic communications devices.

As shown by way of example in FIG. 1, the mobile device, which is generally designated by reference numeral 100, includes a processor 110 and memory 120, 130 for executing one or more applications. The memory may include flash memory 120 and/or random access memory (RAM) 130. Other types or forms of memory may be used.

As depicted by way of example in FIG. 1, the mobile device 100 includes a user interface 140 for interacting with the mobile device and its applications and, in this instance, for receiving user input to set up a call to another device. The user interface 140 may include one or more input/output devices, such as a display screen 150 (e.g. an LCD or LED screen or touch-sensitive display screen), and a keyboard or keypad 155. The user interface may also include an optical jog pad 160 and/or a thumbwheel, trackball, track pad or equivalent.

As depicted by way of example in FIG. 1, the mobile device 100 may include a wireless transceiver 170 for communicating with other devices. The transceiver 170 may be a radiofrequency (RF) transceiver for wirelessly communicating with one or more base stations 50 over a cellular wireless network using cellular communication protocols and standards for both voice calls and packet data transfer such as GSM, CDMA, GPRS, EDGE, UMTS, LTE, etc. Where the computing device 100 is a wireless communications device, the device may include a Subscriber Identity Module (SIM) card 112 for GSM-type devices or a Re-Usable Identification Module (RUIM) card for CDMA-type devices. The RF transceiver 170 may include separate voice and data channels.

The mobile device 100 may optionally include one or more ports or sockets for wired connections, e.g. USB, HDMI, FireWire (IEEE 1394), etc. or for receiving non-volatile memory cards, e.g. SD (Secure Digital) card, miniSD card or microSD card.

For voice calls, the mobile device 100 includes a microphone 180, a speaker 182 and/or an earphone jack. Optionally, the device may include a speech-recognition subsystem for transforming voice input in the form of sound waves into an electrical signal. The electrical signal is then processed by a speech-recognition module (digital signal processor) to determine voice commands from the voice input. Voice commands may be used to initiate a call and to select the call recipient from an address book.

Optionally, the mobile device 100 includes a positioning subsystem such as a Global Positioning System (GPS) receiver 190 (e.g. in the form of a chip or chipset) for receiving GPS radio signals transmitted from one or more orbiting GPS satellites. References herein to "GPS" are meant to include Assisted GPS and Aided GPS. Although the present disclosure refers expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

Another sort of positioning subsystem may be used as well, e.g. a radiolocation subsystem that determines its current location using radiolocation techniques, as will be elaborated below. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. A Wi-Fi™ Positioning System (WPS) may also be used as a positioning subsystem. Radiolocation techniques and/or WPS may also be used in conjunction with GPS in a hybrid positioning system.

Optionally, the mobile device 100 may include a Wi-Fi™ transceiver 192, a Bluetooth® transceiver 194, and/or a near-field communications (NFC) chip. The mobile device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the mobile device may include other sensors like a digital compass 196 and/or a tilt sensor or accelerometer 198.

The mobile device 100 thus uses its memory 120, 130 to store all place data for the mobile device in a centralized place data store for each of a plurality of places. The centralized place data store may be a single data store or may be a group of co-operative data stores, or any suitable arrangement of data stores. The centralized database or data store may be a unified, common, or shared database or data store. The processor 110 is operatively coupled to the memory 120, 130 to execute a plurality of applications. These applications may require positioning data, e.g. GPS coordinates. The processor determines when location data or more broadly place-related data is required for the applications and obtain all of the location data and/or place-related data required for all applications on the mobile device from the centralized place data store (or database) 200. In another implementation, the centralized data store (or database) may be situated at a server that is accessible by the mobile device.

For the purposes of this specification, place data (or place-related data) is data, e.g. computer-readable code, that represents place-related information or place-related content that describes a place. The place-related content and information may be text, maps, photos, video, audio files, or other data. The place-related information and content is thus a multi-faceted description of the place. One element of this description is the location of the place, which may be characterized by location data, such as for example location coordinates, a street address, etc. Thus, the place data encompasses the location data. For the purposes of this specification, place data is meant to encompass not only the data itself but also any references or links to place data stored externally to the centralized place data store. In some embodiments, there may be restrictions inhibiting the physical storage of all place data in the centralized place data store with the rest of the place data. Examples of externally stored data may be any restricted, confidential, or proprietary data that may not be copied to the centralized data store. In these embodiments, only the references or links to the externally stored data are actually stored in the centralized place data store, not the data itself. Nonetheless, the centralized place data store remains the sole recipient of all place data requests from applications. In other words, all applications on the mobile device access only the one centralized place data repository for all required place data.

In one embodiment, the centralized place data store 200 comprises, for each place, a place tag identifying the place. The place is either a physical location or, in some embodiments, a virtual location. A physical location means a geographical location somewhere on earth. A virtual location may be a virtual location or an event that is a proxy for a location such as a meeting (Web conference), conference call, or some other proxy for location that has a location-implicit meaning to the user. In other words, although a virtual meeting may be physically performed at any computer, to the user this virtual meeting implies a place (e.g. his home computer or alternatively his work computer, depending on his own personal context). The physical location is defined by location coordinates, e.g. latitude and longitude coordinates which may be GPS-derived. A user-specified virtual location descriptor identifies the virtual location to the user and this virtual location does not have any physical coordinates associated with it.

Figure 2:
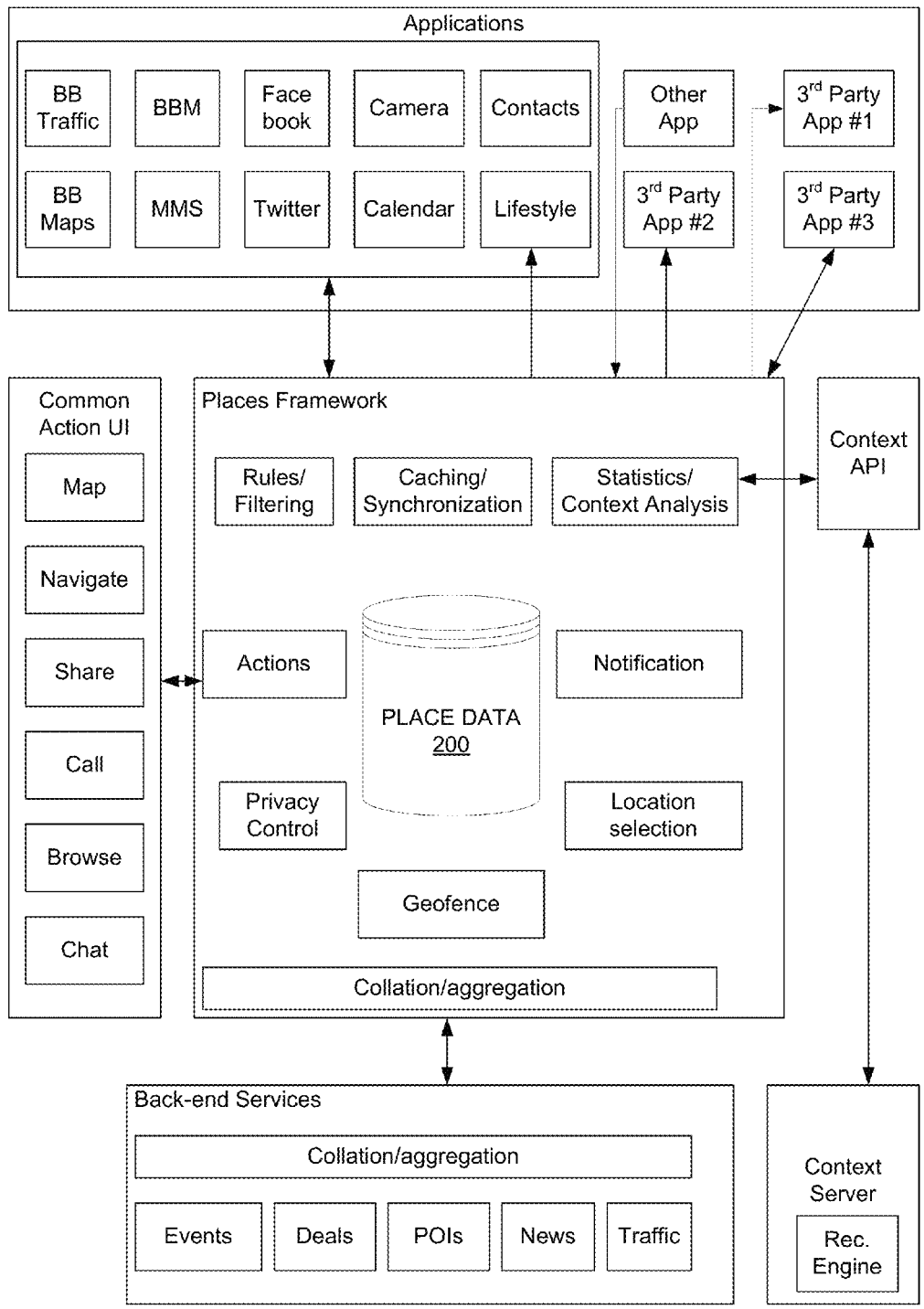
FIG. 2 is a functional block diagram of a place-data management system in accordance with one implementation of the present technology.

Conceptually, the centralized place data store 200 may be understood as being the core of a places framework such as the one depicted schematically in FIG. 2. The place-related data is not only centralized but this data includes semantic place data that provides a much richer level of place-related content that is conventionally provided. As shown by way of example in FIG. 2, a plurality of device applications (be it applications that are native to the device or third-party applications) interact with the place framework. Some apps may be place data contributors, some may be place data consumers, and some may be both consumers and contributors. This framework includes various modules, as shown, for rules/filtering, caching/syncing, statistics/context analysis, actions, privacy control, notification, location selection, geofencing, collation/aggregation. The actions module interacts with a common action UI that provides functionalities such as mapping, navigation, sharing, calling, browsing, chatting, etc. Therefore, for any location, any of these functions can be performed. In one embodiment, depending on the types of place content available for the place, the relevant actions will be associated with the data and thus can be visually presented to the user and acted upon. The place content type may thus limit the available functionalities/actions for a given place. For example, a share action may be possible for a virtual place whereas a map/navigate action would only be applicable to a physical place (i.e. a real-world location). Backend services, as shown in FIG. 2, may provide collation/aggregation of various content types such as events, deals, POIs, news, traffic incidents, etc. As further depicted by way of example in FIG. 2, the system may include a context API that interacts with a context server having a recommendation engine. This context server may be used to monitor usage patterns (user behaviour) at a given place to see what the user does at that place. Based on the activities and the data requests of the user at that place, the system can intelligently learn the user's personal preferences as they relate to that specific place. This contextual information may be used to supplement the place data in the centralized place data store 200.

Figure 3:
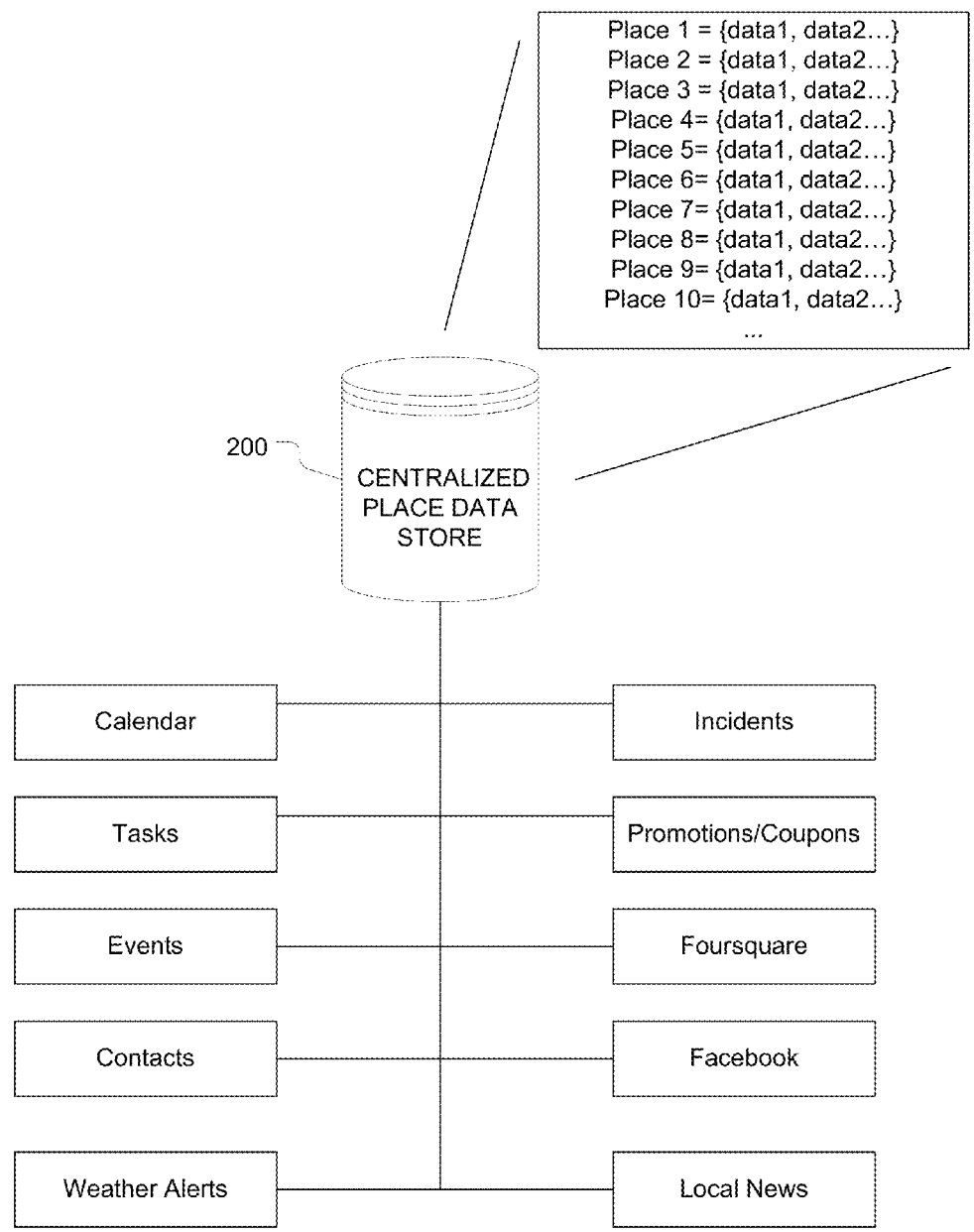
FIG. 3 is a schematic depiction of the centralized place data store for providing all place data to all applications executed by the mobile device.

As further illustrated by way of example in FIG. 3, the centralized place data store 200 stores all of the place-related data for a plurality of places. The places may be user-defined or externally defined places. As shown in FIG. 3, the store 200 stores a collection or list of places. Associated with each place is a set of place-related auxiliary data (or synonymously "place data" or "place-related data"). Place auxiliary data is either application-specific data or non-application specific data that describes the place. An example of application-specific auxiliary data are meeting attendees (Calendar app) associated at this given place. An example of non-application specific auxiliary data are video, documentary/blogs, statistical data, etc. . . . associated with the place. The place-related auxiliary data can be physically stored in the central Places database or referenced in the Places database to their respective sources. Each application (calendar, tasks, events, contacts, weather alerts, incidents, promotions, Foursquare, Facebook, local news, etc.) obtains all of its place-related data from the centralized place data store 200. This consolidated data store simplifies data updates, ensure consistency of data, and minimizes memory usage.

Figure 4:
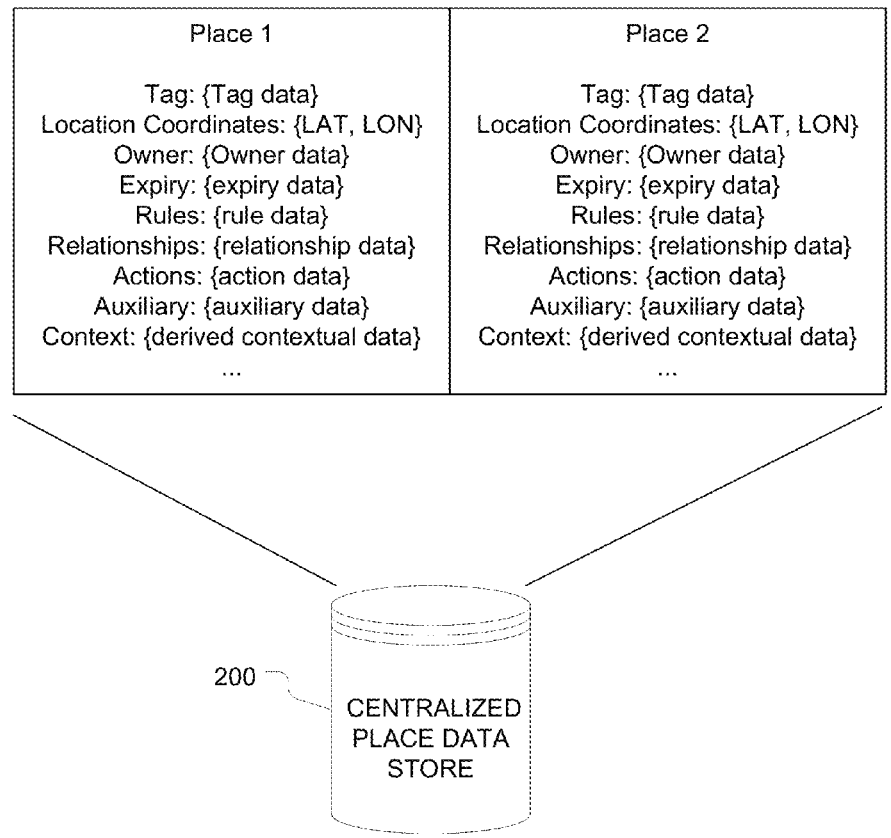
FIG. 4 is a schematic depiction of the various categories or types of place data that the place data store maintains for each place.

FIG. 4 depicts schematically the various types or categories of place data that may be stored in the centralized place data store 200. For example, each place may be characterized by a tag (name) describing the place, location coordinates (latitude and longitude), its category, a description of the place, keywords related to the place, a start/end time (or an expiry time for the data), auxiliary data such as contacts related to the place, images or photos of the place, videos of the place, URLs to websites related to the place. In addition, as shown in FIG. 4, there may be categories such as available actions, rules governing how the place data is to be shared or not amongst the applications running on the device or how this data is accessed, persisted or visually presented, relationships to contacts or other persons, events, or other places that are in some way related to the place, etc. Relationships may also include relationships between the and another place or between the place and a plurality of other places. Relationships may also encompass relationships between a place and an event. The relationship between a place and people or events is described in the auxiliary data. As will be appreciated, the categories or types of data may vary. Not all of the types or categories of data for a given place will be specified. In some embodiments, only a subset of these categories are utilized.

For example, in one embodiment, the centralized place data store comprises, for each place, a data owner identifier that identifies an application that owns the data. In one embodiment, the centralized place data store comprises, for each place, a set of rules specifying how the data is to be shared, accessed, persisted or visually presented. In one embodiment, the centralized place data store comprises, for each place, a set of relationships identifying contacts related to the place. In one embodiment, the centralized place data store comprises, for each place, an expiry date specifying when the data will expire or need to be refreshed. In one embodiment, the centralized place data store comprises a set of actions to be performed which are relevant or applicable to the place. Any combination of these data characteristics or attributes may be utilized to characterize a place, i.e. to give the place its semantics.

As mentioned above, place data may also be inferred or learned by the mobile device in response to user behaviour or activities performed by the user using the mobile device when situated at a place or when requesting data about a place. Therefore, in one embodiment, the processor and memory cooperate to monitor usage of location and/or place data by a user of a mobile device when located at a place, derive contextual information about the place and the personal preferences of the user with respect to the place, and integrate the contextual information as additional place-related data.

In another aspect of the technology, the mobile device may regulate how place data is delivered to the various applications on the mobile device. Therefore, in one embodiment, the processor and memory cooperate to register an application for proximity notification. The processor then determines if the mobile device is within a predetermined proximity of a place. In response to determining that the mobile device is within the predetermined proximity of the place, the processor provides a proximity notification to the application.

Figure 5:
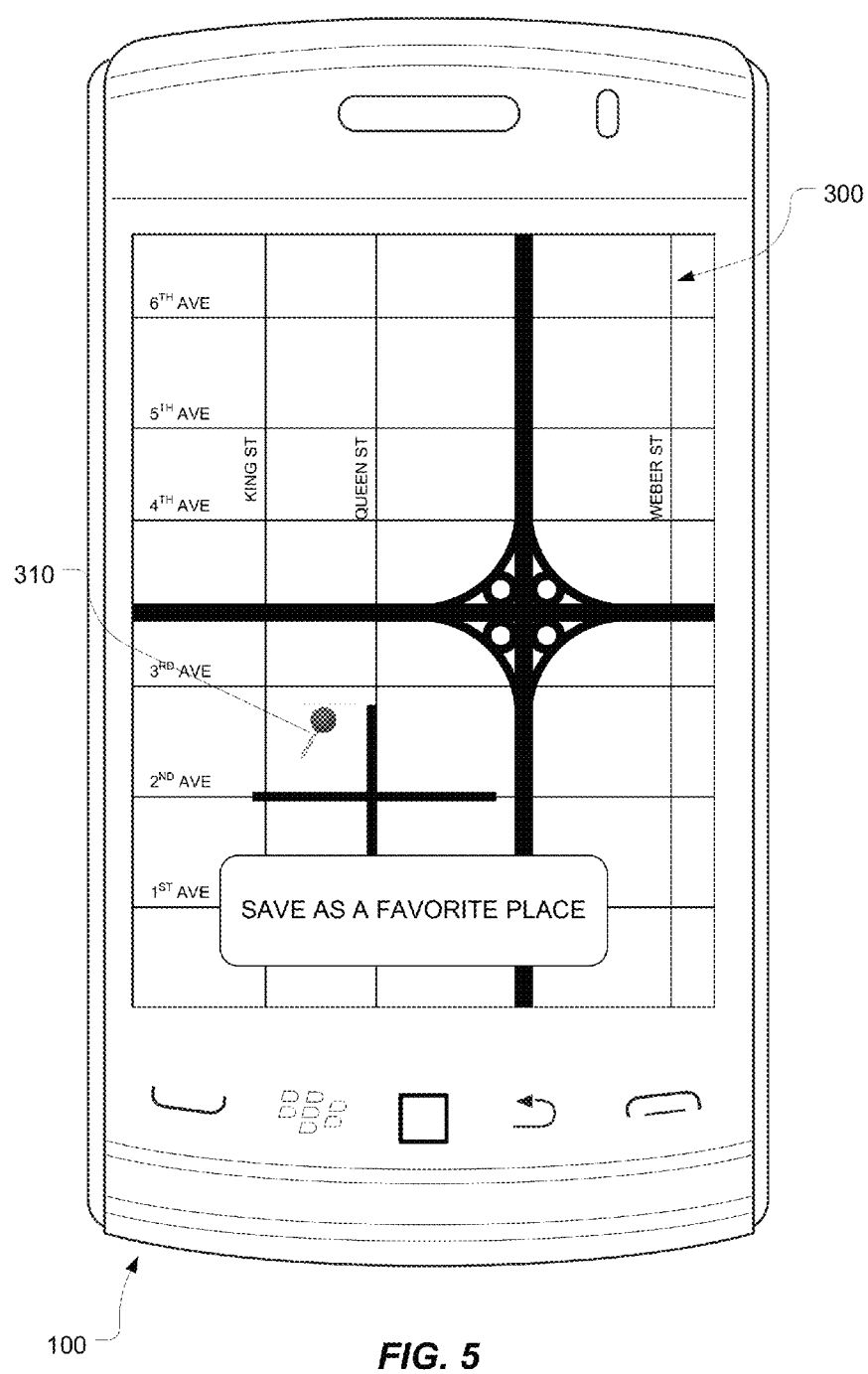
FIG. 5 is an example of a map displayed by a mapping application on a mobile device, showing a user interface element for setting a POI as a favourite place.

FIG. 5 is an example of a map displayed by a mapping application 300 on a mobile device, showing a user interface element for setting a POI 310 as a favourite place.

Figure 6:
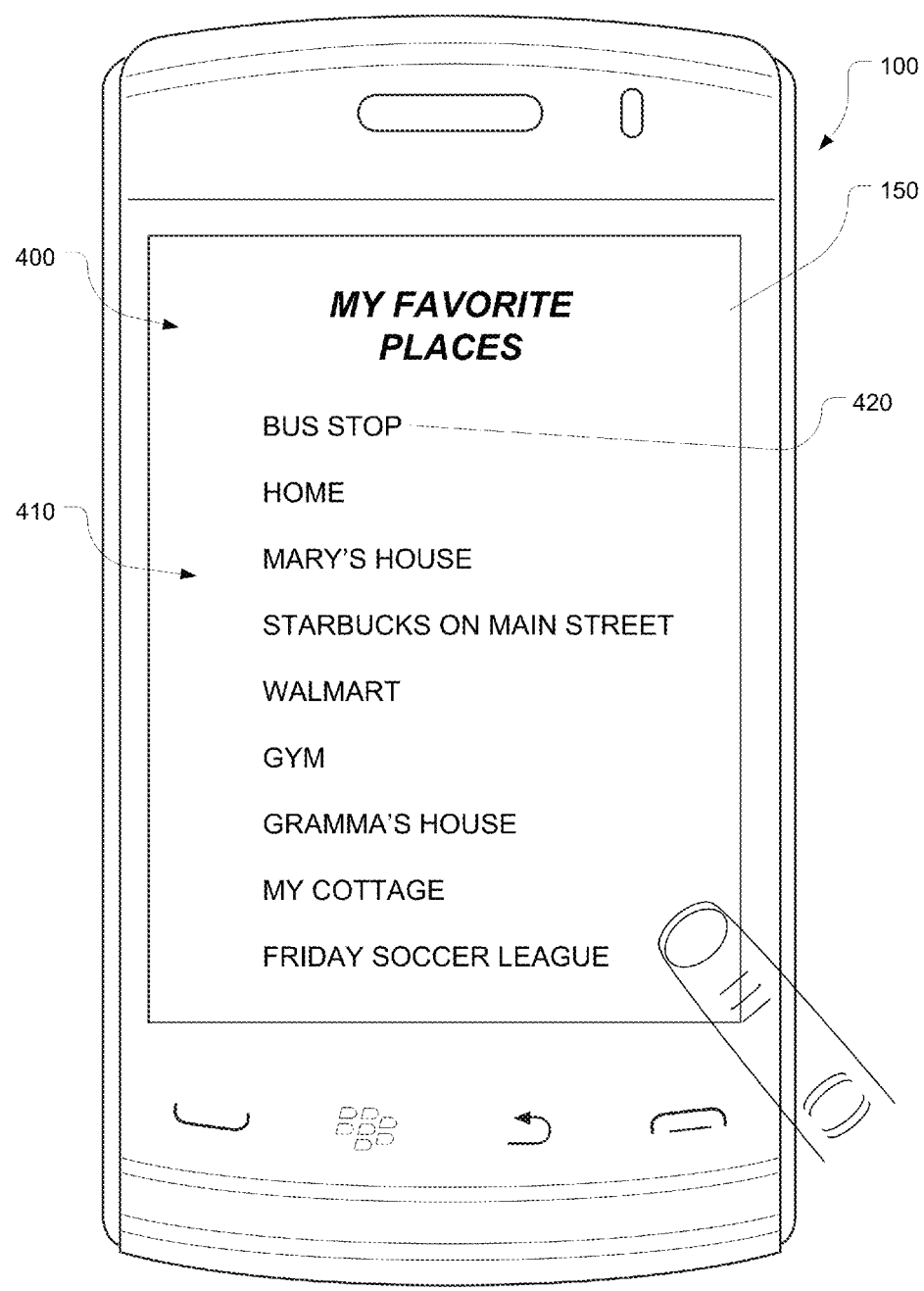
FIG. 6 is an example of a UI that presents favourite places.
Figure 7:
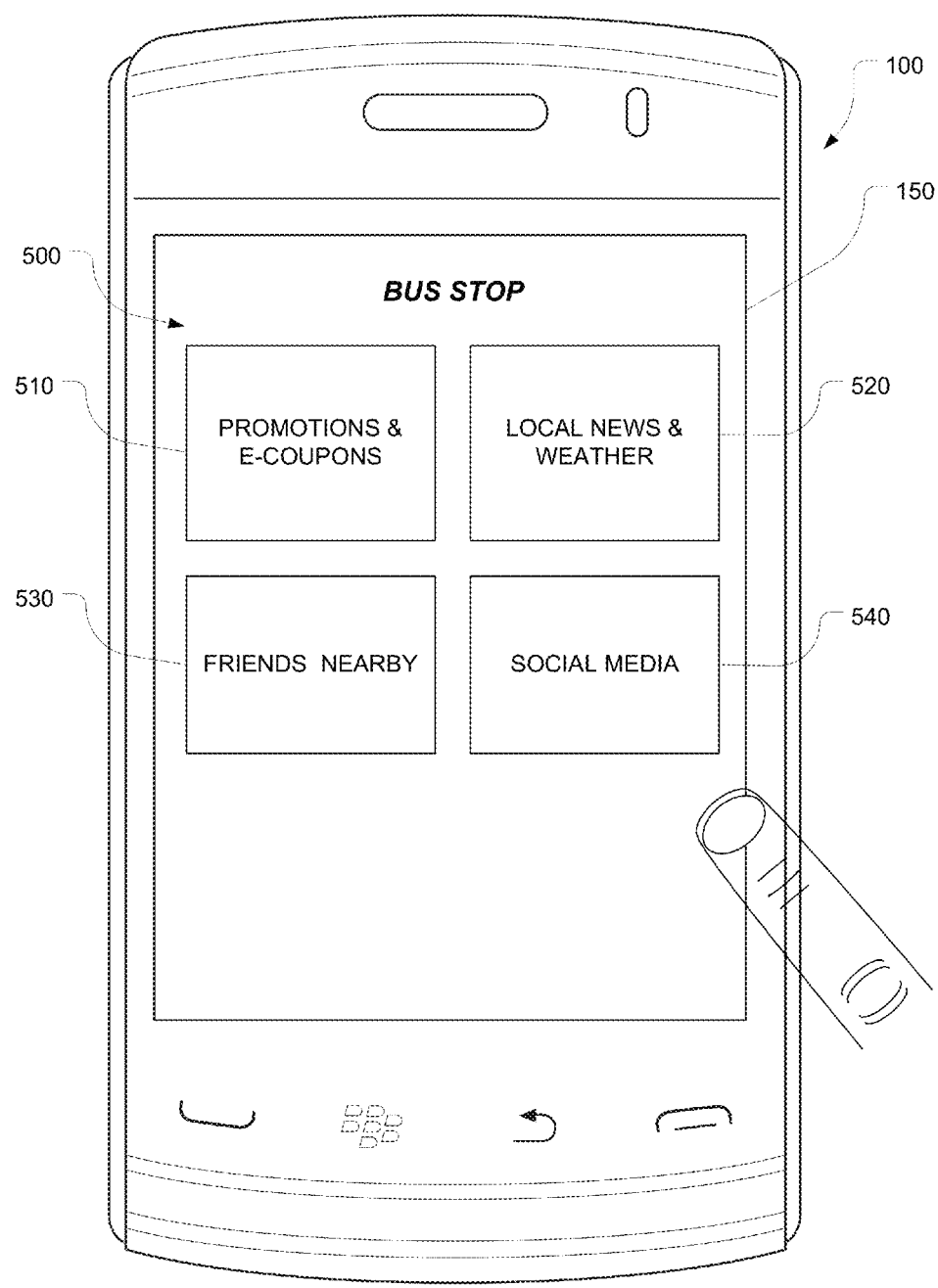
FIG. 7 is an example of a UI that presents place data for one selected place.
Figure 8:
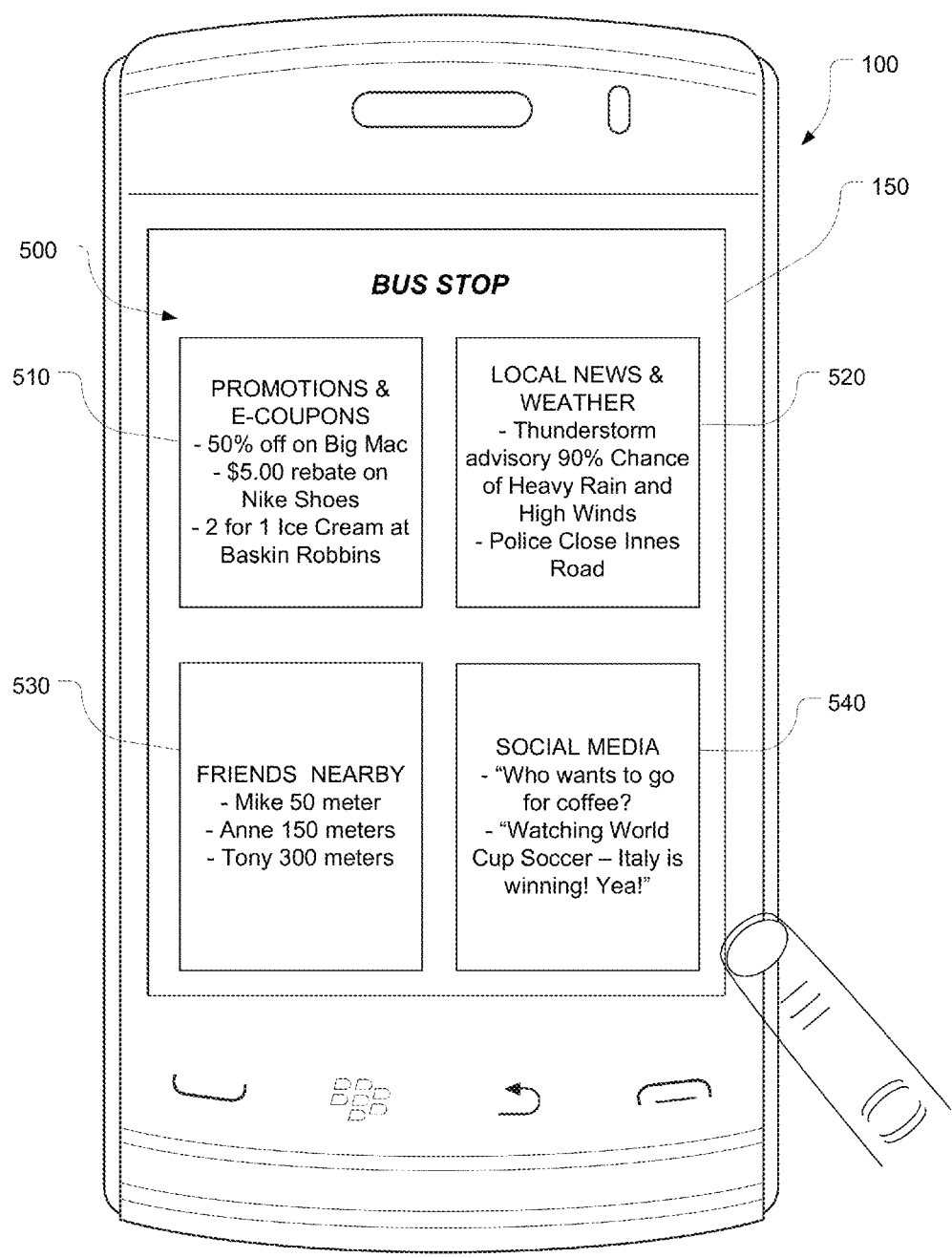
FIG. 8 is another example of a UI that presents place data for one selected place.
Figure 9:
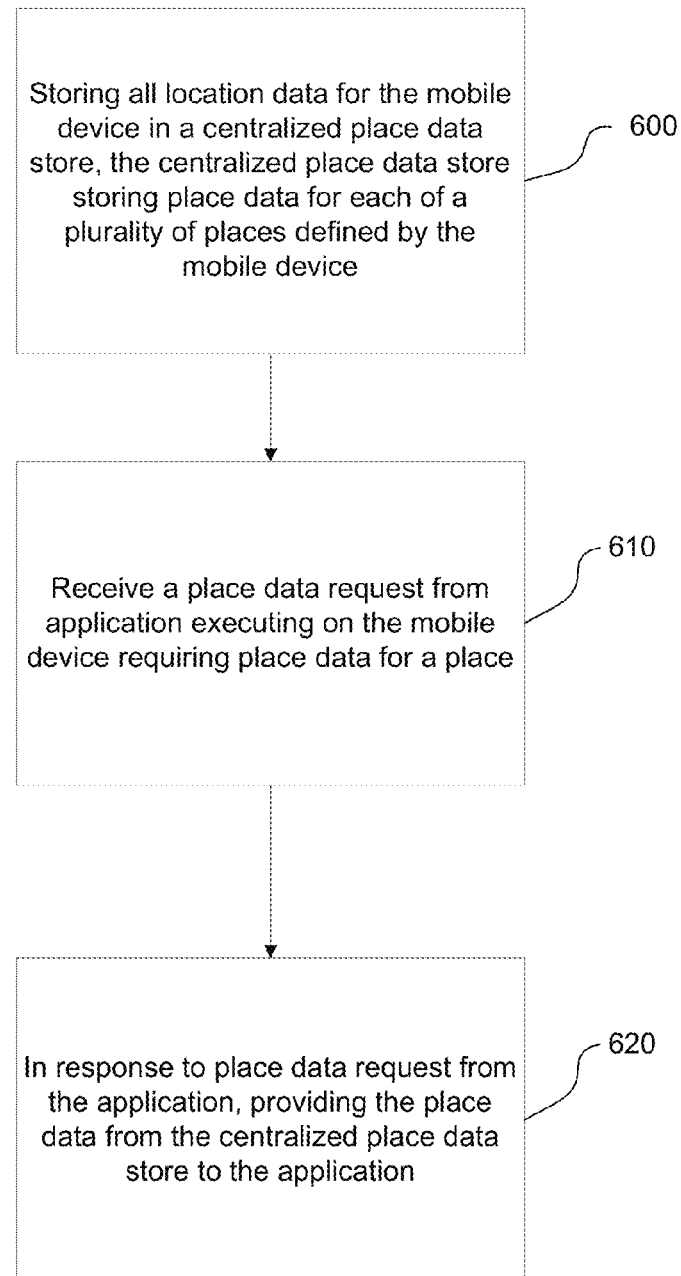
FIG. 9 is a flowchart depicting steps of a method in accordance with one implementation of the present technology.

FIG. 6 is an example of a UI that displays favourite places ("My Favourite Places") on a display screen 150 of a mobile device 100. The favourite places UI 400 presents the favourite places as a favourite places list 410, although the favourite places may be displayed in any suitable format. In one embodiment, each listed place 420 is user-selectable (by touching or any other appropriate form of user input) to obtain more information about the listed place. For example, touching or selecting bus stop will cause the device 100 to display a place view for the bus stop. The place view may present place-related information (i.e. auxiliary data related to the place) as shown in FIG. 7 or, alternatively, FIG. 8. In the example of FIG. 7, the place view 500 displayed on the display 150 of the mobile device 100 comprises a plurality of user-selectable categories of place-related data, e.g. promotions & e-coupons 510, local news & weather 520, nearby friends 530 and social media 540. These are solely by way of example, and other categories, layouts or labels may be used. The user may select any one of the categories 510-540 by touching the user interface elements. Alternatively, as shown in FIG. 8, the UI may display all or a subset of the available and most recent place data based on time received, relevancy, or any other prioritization scheme. The UI in FIG. 8 shows the promotions and e-coupons that are relevant for the place (i.e. for the Bus Stop), the local news and weather for the bus stop, which friends are near the bus stop, and any social media feeds that may have some relevancy to the area surrounding the bus stop. The place view thus consolidates and presents all place-related content to the user when the user selects the place. Note that selecting a place may be done without the user physically traveling to the place although in one embodiment the place may be set to correspond to the current location of the mobile device. For each UI shown in FIGS. 6-8, there may be applicable actions displayed as will be illustrated, for example, in FIG. 11c). The actions may include, for example, map, go, browse, call, etc. for the selected place The foregoing technology also provides a novel method of managing place data for a mobile device. As outlined by the flowchart depicted in FIG. 9, the method comprises a step 600 of storing all place data for the mobile device in a centralized place data store. The centralized place data store stores place data for each of a plurality of places. At step 610, a place data request is received from an application executing on the mobile device. The application requires place data for a place. At step 620, in response to the place data request from the application executing on the mobile device, the device provides the place data from the centralized place data store to the requesting application. Centralizing all place data in a central place repository enables place data to be viewed, updated or added by one application to be accessible to all other applications that have the permission to view that place data. The centralized database makes data sharable among apps on the device, improves security/privacy by implementing configurable data-sharing rules, ensures consistency in how data is presented and used, optimizes memory usage as data is no longer duplicated for each app, and it extensible as new place content sources can be plugged in remotely or onboard. In some embodiments, the place data requests do not need to be received concurrently or simultaneously, and furthermore the applications executing on the device also do not need to be executing concurrently or simultaneously. In some embodiments, all place data is stored in the data store whereas in other embodiments, not all of the place data is stored in the data store.

FIGS. 10a-17c present various user interfaces that may be used on a mobile device in relation to the foregoing technology. These are presented solely to further illustrate the inventive concepts and should not be interpreted as limiting the invention or as representing the only UIs that may implement this novel place-data-centric paradigm. Other UIs with other layouts, configurations, and labels may be employed to implement this novel technology.

Figure 10D:
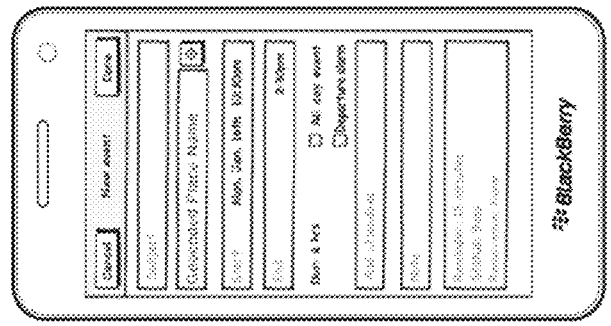
FIGS. 10a-10d depict mobile device user interfaces for creating new data for a place.
Figure 10C:
Figure 10B:
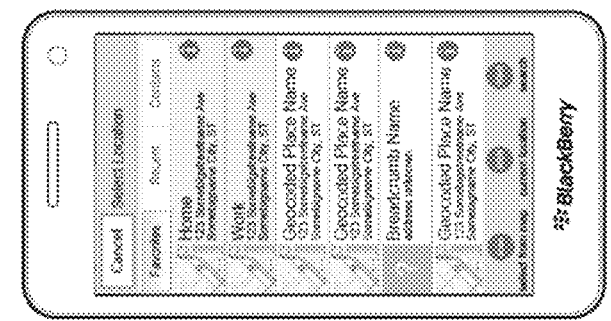
Figure 10A:
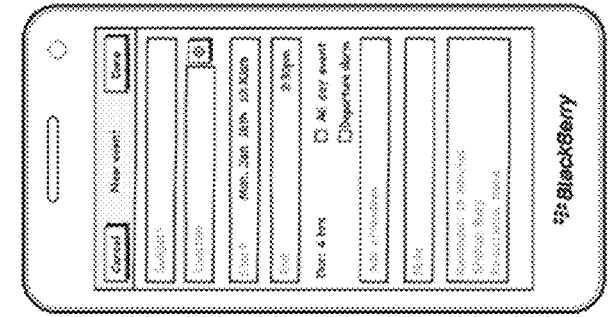

FIGS. 10a-10d depict mobile device user interfaces for creating new data for a place. FIG. 10a shows a UI for creating a new event. Exemplary fields include subject, location, start time, end time, attendees, notes, reminder, status, recurrence, etc. Similarly, FIG. 10d shows the UI in which the location field of the meeting event is now populated with the place selected by the user via the UIs depicted in FIGS. 10b and 10c. FIG. 10b shows a UI that displays a list of places or locations. The device may provide a favourites list, a recent list, and a contacts list, as shown. User interface elements may be provided to select a location from a map, to use the current location of the device or to search. FIG. 10c depicts a UI that displays a place ("Johnny's school"), its address, distance, driving time (ETA), contact information (the principal's name), phone number, and notes relating to the place (i.e. relating to the school).

Figure 11C:
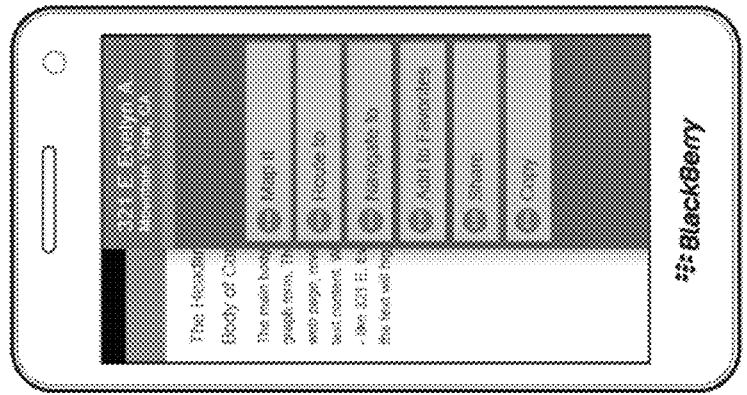
FIGS. 11a-11c depict mobile device user interfaces for displaying a menu of action options for performing various actions in relation to a place.
Figure 11B:
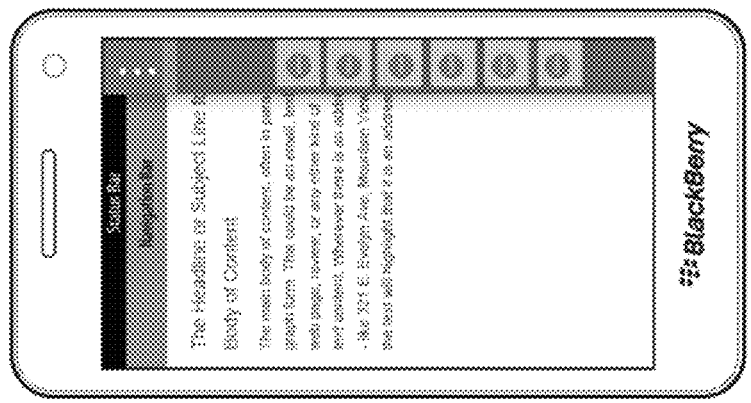
Figure 11A:
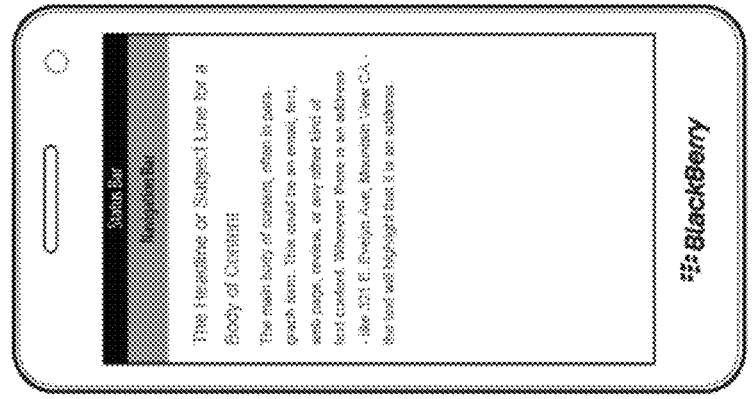

FIGS. 11a-11c depict mobile device user interfaces for displaying a menu of action options for performing various actions in relation to a recognized place in the text field. Specifically, FIG. 11a shows a UI displaying a corpus of textual content from which an address is identified. Identification of the address may be done by parsing the text. The address may be hyperlinked or otherwise highlighted. A menu may slide out from the right side of the UI, as shown in FIG. 11b to provide menu items (actions) that may be performed in relation to the location (address). For example, the menu items may include actions such as map it, route to, navigate to, add to favourites, share, copy, etc. The add to favourites action adds the place to the Places repository, e.g. to the centralized place database.

Figure 12C:
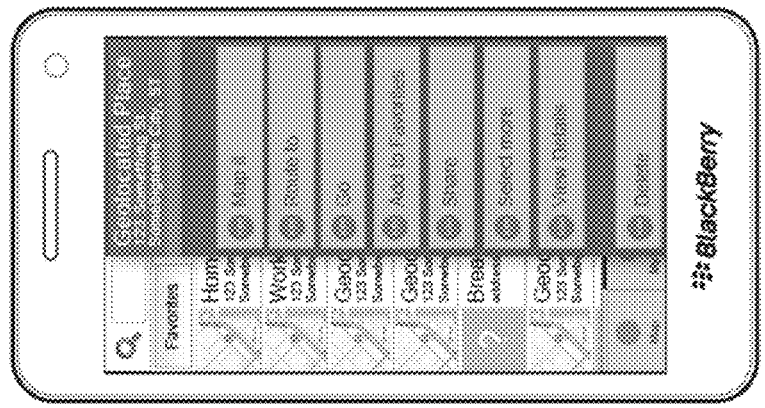
FIG. 12c depicts a menu of action options for performing various actions in relation to a geolocated place.
Figure 12B:
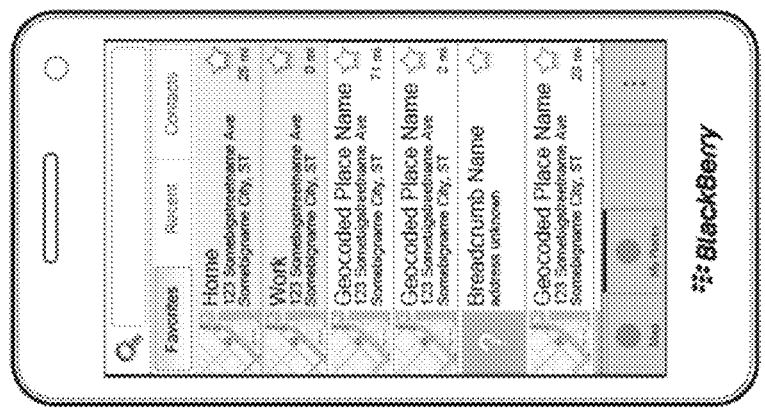
FIGS. 12a-12b depict mobile device user interfaces that enable toggling between a map and a list of favourite places ("My Places")
Figure 12A:
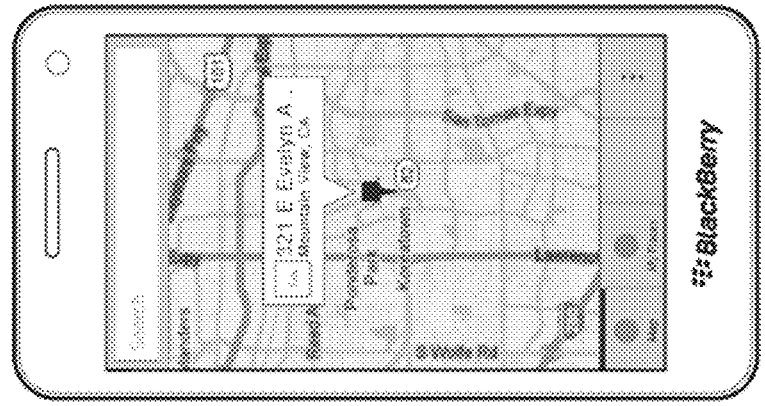

FIGS. 12a-12b depict mobile device user interfaces that enable toggling between a map and a list of favourite places ("My Places"). Specifically, in FIG. 12a, a map is displayed on a mobile device to show, in this example, a pushpin icon representing a specific address. The address is displayed in this example in a text bubble or callout that points to, or is otherwise associated with, the pushpin icon. The UI may comprise a map button and a My Places button (e.g. at the bottom of the screen, below the map, as shown by way of example in FIG. 12a). These buttons may be touched or selected to toggle between a map view and a places view such as the one shown by way of example in FIG. 12b. The user may then touch or select any one of these places. In response to touching a place, an action menu is then displayed as shown in FIG. 12c. This menu of action options enables the user to perform various actions in relation to a place such as map it, route to, go, add to favourites, share, select more, view details, delete, etc.

Figure 13D:
FIGS. 13a-13d depict various place-related user interfaces.
Figure 13C:
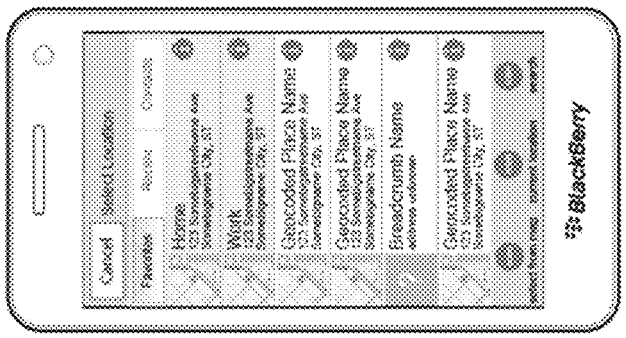
Figure 13B:
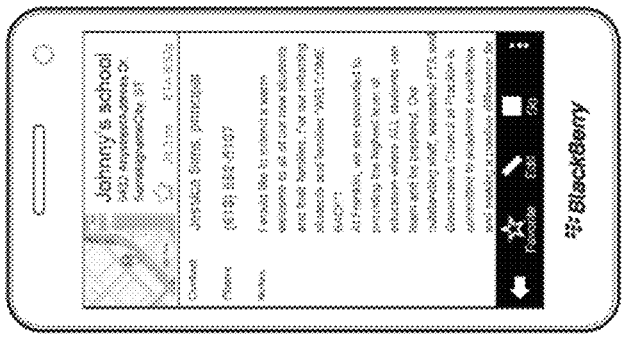
Figure 13A:
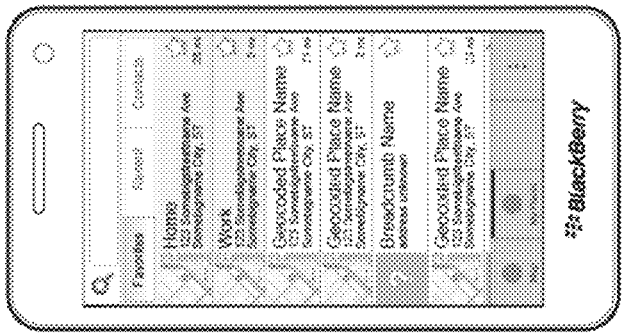

FIGS. 13a-13d depict various place-related user interfaces as further examples. These figures illustrate the concept of providing place details for a selected place. For example, from the UI of FIG. 13a, the user may select one of the listed places to obtain place details such as shown in FIG. 13b. Likewise, the user may select a place displayed on the UI of FIG. 13c to obtain place details as shown in FIG. 13d.

Another set of examples (FIGS. 14-17c) illustrate how place-related place data may be exploited to provide new device functionalities and features that were hitherto not possible with pre-existing technologies. In these figures, a place is defined in terms of a predetermined proximity to a place, in this example a user-specified address (e.g. "Near 474 March Rd"). The device may be configurable to specify a distance threshold, spatial tolerance or radius that defines "near", e.g. within 50 meters, 100 meters, 250 meters, 1 km, 10 km, etc. In other embodiments, the device may provide a tiered approach, defining "at" to be within 10 meters, "near" to be within 100 meters, and "in the same general vicinity" to be within 1 km, for example. These examples illustrate how a given application executing on the mobile device or even multiple applications acting in concert or executing in parallel, may retrieve or obtain from the central place data store whatever place-related data is available for the place selected by the user or otherwise identified as the desired place by the mobile device. In each instance, the device may use this place-related data to provide location-based services (LBS) or may display the place-related data to the user in any number of ways, some of which are presented below.

Figure 14C:
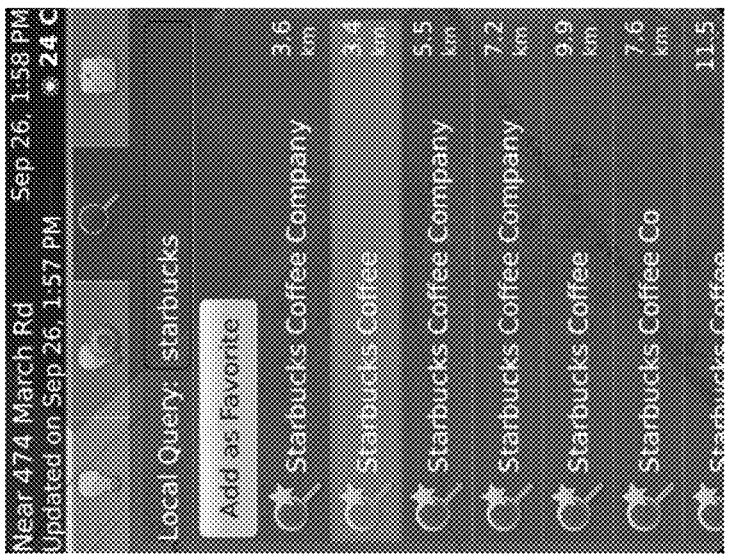
FIG. 14c depicts a local query UI with a UI element for adding one of the search results as a favourite place.
Figure 14B:
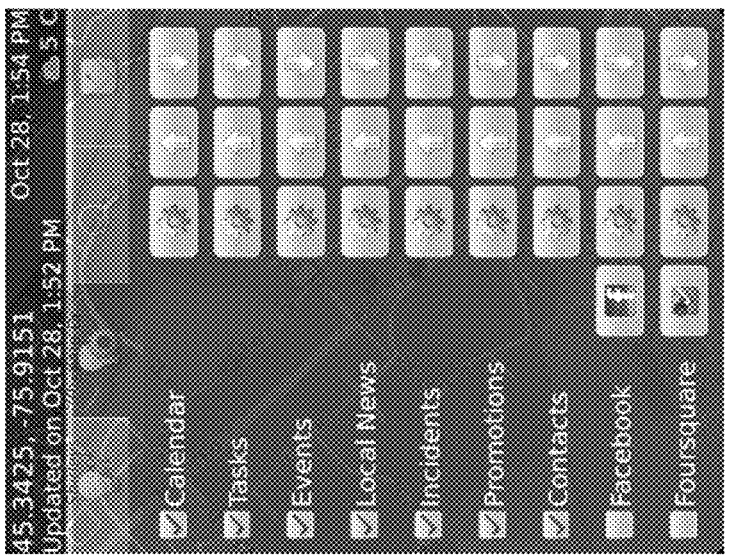
FIG. 14b depicts a UI that enables the user to control which types of content is to be presented.
Figure 14A:
FIG. 14a depicts a place view UI that lists all content related to the place.

FIG. 14a depicts a place view UI that lists all content related to the place, i.e. all content relevant to the user's current location at that particular time that is, or might be, of interest to the user. This UI is an example of how a place view may present place-related information to the user of various types (i.e. for various applications). For example, as shown in FIG. 14a, the place view presents a calendar entry, local news, local events/POIs. This UI thus provides a consolidated (overview) display of all place-related content where the displayed items of content are associated with a plurality of different applications. FIG. 14b depicts a UI that enables the user to control which types of content is to be presented on this consolidated (overview) display. Other functionalities may be provided on these UIs. For example, near the top of each screen are user interface elements that provide functionalities such as view list, configure which applications to show, search and view map. For example, touching the search button will cause the UI to switch to a search screen such as the one depicted in FIG. 14c. As shown in FIG. 14c, the local query may be entered. Search results are displayed along with distance information. A UI element is provided for adding one of the search results as a favourite place.

Figure 15B:
FIG. 15b depicts a map showing a POI augmented with location-based advertising.
Figure 15A:
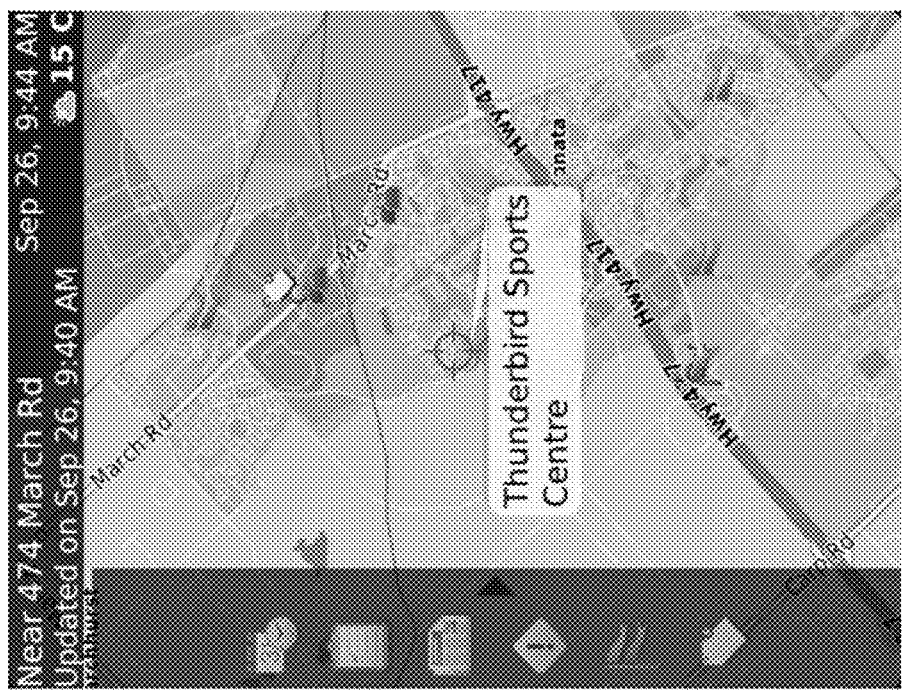
FIG. 15a depicts a map showing a POI that is near a place.

FIGS. 15a and 15b show how points of interest (POIs) may be displayed near the place selected by the user or otherwise identified by the mobile device. The POI may be filtered by user preferences, which may have been set explicitly by the user or which may have been learned by monitoring usage patterns of the mobile device at this or other places. FIG. 15a depicts a map showing a POI that is "near 474 March Rd". In FIG. 15a, the POI ("Thunderbird Sports Centre") may be of interest to the user because of some prior relationship with that POI (visited there, placed a phone call there, e-mailed there, visited their website, searched for sports centres, etc.)

FIG. 15b depicts a map showing a POI augmented with location-based advertising "First Bank: Check out the savings!". This figure shows a map corresponding to the content shown in FIG. 14A, with the ad or promotion in focus. The location-based advertising (LBA) may be filtered based on user settings and/or based on usage patterns. For example, the mobile device may recognize that the user has recently searched for banks, or has visited this bank in recent months, done online banking with that bank, or has a friend or contact that works there, etc.

Figures 16A, 16B, 16C:
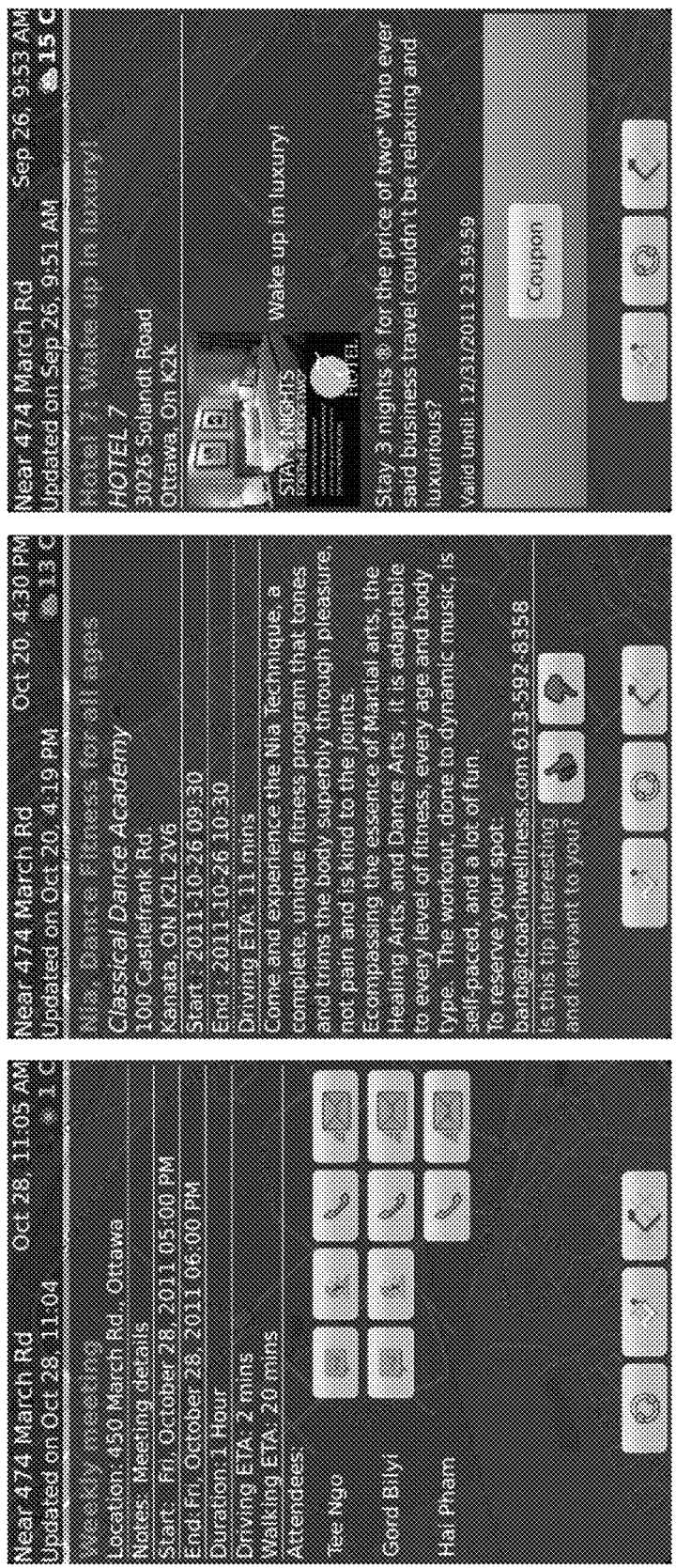
FIG. 16a depicts a place view for a weekly meeting.
FIG. 16b depicts one example of a place view for a commercial establishment.
FIG. 16c depicts another example of a place view for a commercial establishment.

FIGS. 16a-16c depict further UI examples of how place-related content may be delivered and presented to the user of the mobile device.

FIG. 16a depicts a place view for a weekly meeting as one example of a calendar event. This calendar event may be stored in the calendar application data store but the location data and any other place-related information about the place where the meeting occurs every week is stored in the centralized place data store. This UI may be accessed by opening or viewing the weekly meeting entry in the calendar application which then queries the centralized place data store to obtain the place data for this place and any place-related information that may be relevant to the user for that place. Alternatively, the user may access this calendar entry via the places view by navigating to the place in question (e.g. using My Places) and then clicking on the calendar event that is listed for that place. In FIG. 16a, the UI presents an indication of the address of the place (e.g. "near 474 March Rd"), the current date and time, current weather conditions, and an indication of when the place data was most recently updated. The UI also specifies the event location, start and end times, the driving and walking times (ETA) from the current location to the meeting or event location. Also noteworthy are the list of attendees who are scheduled to attend the meeting, as well as a plurality of user-selectable icons or interface elements that enable the user to communicate or otherwise interact with any one of the attendees. The attendees are examples of relationships (mentioned above) for the place. Other examples of relationships may be a pool of tennis players with whom a user habitually plays at a tennis club. When the user accesses the place view for the tennis club, these contacts may be displayed.

FIG. 16*b* depicts another example of a tip or suggested event that is suggested by the device to the user based on contextual information gleaned by the device about the user's habit and behaviour at that place. In this case, the device learns that the user enjoys attending dance classes at a nearby dance academy. The device then suggests to the user that she consider attending an upcoming dance class at the dance academy. This suggestion or tip enhances the user experience by informing the user of events, activities, offers, promotions, opportunities, etc. that are local or proximate to one of the user's places.

In addition to the address, start and end times, and driving time, the tip UI may present a description of the event or appointment, contact information (e-mail and phone) for reserving a spot at the dance class. The UI may present tip feedback icons (thumbs-up and thumbs-down icon, or yes/no, or a rating scale). Soliciting and obtaining this direct feedback from the user is another way of learning usage patterns, interests and preferences of the user. Future tips can be refined based on whether the user found the tip, suggestion or offer interesting. These tips may be generated by the mobile device or they may originate as LBA, which the device can filter or even modify (e.g. reformatting content) for the device.

FIG. 16*c* depicts an example of LBA that is offered to the user of the mobile device. In this example, the UI displays the ad or promotional offer onscreen. The offer, in this particular example, contains an e-coupon. A user interface element ("Coupon") may be displayed onscreen to permit the user to download the e-coupon.

FIGS. 17*a*-17*c* depict various further example place views where the place is again defined in terms of a predetermined proximity to the same specified address (e.g. "Near 474 March Rd"). Once the place and its distance threshold has been set, as described above, the application (contacts) may request any contacts that are at this place (i.e. at or near 474 March Rd). By applying this filter, the contact Gord Bilyi is provided from the centralized place data store to the contacts application which can then display the contact for the place. Various user interface elements may be provided to interact with the contact, e.g. send mail, call, navigate to the contact's location, etc. As further depicted by way of example, the UI may also display an update time indicating when the data was last updated (e.g. "Updated on September 26, 1:57 PM").

In FIG. 17*b*, the place has been used to obtain information about a local coffee shop ("Tim Hortons") that is near 474 March Rd, e.g. via a local search or local query filtered using the location of the place. The address, phone number, rating, driving time, walking time are displayed in this example, along with the update time indicating when the data was last updated.

As another example, FIG. 17*c* depicts a place view that presents an intersection near 474 March Rd for the purposes of providing a traffic update. When launching a traffic application using the place "near 474 March Rd", the device identifies an intersection where there is a traffic alert, construction or road condition update.

In addition to the contacts, local search and traffic examples presented in FIG. 17*a*-17*c*, many other applications may require place data such as, but not limited to, a calendar, e-mail, instant messaging (e.g. BBM), MMS, navigation, travel, maps, and various social network applications, etc.

Figure 18:
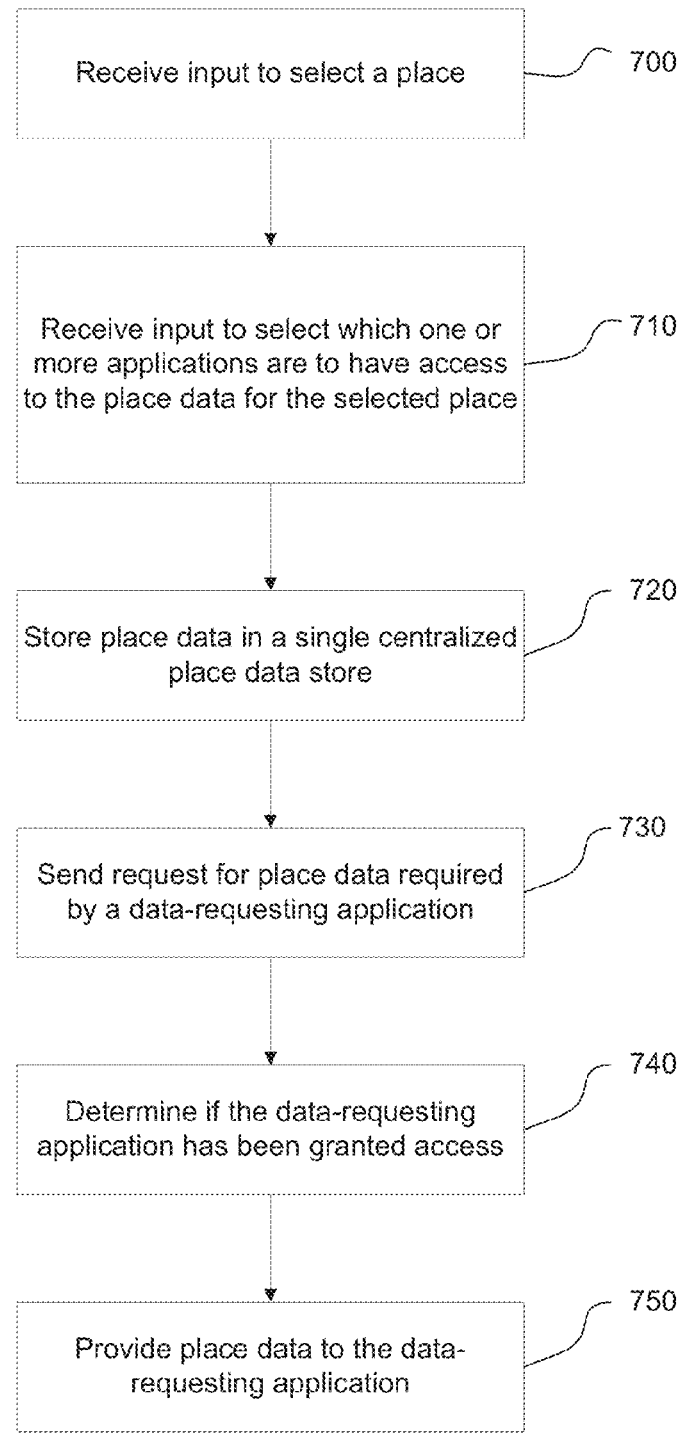
FIG. 18 is a flowchart depicting a method of managing access to place data stored in a centralized place data store.

Managing of Application Access to Centrally Stored Place-Related Data on a Mobile Device An aspect of the present technology is a method of managing place data for a mobile device. In general, as depicted in the flowchart of FIG. 18, the method entails a step 700 of receiving input to select a place, a step 710 of receiving input to specify which one or more applications on the mobile device are to have access to the place data for the place. It is to be noted that the input in step 710 may be user input but it also may be device-generated input derived from the context or environment in which the place selection was initiated or it may be specified by the application that has initiated a place selection routine. In other words, access permissions may be set by the user providing user input or automatically and programmatically by the application itself (without user intervention). As depicted in FIG. 18, the method further includes a step 720 of storing the place data for the place in a centralized place database. A place data request is then made at step 730. It is to be noted that step 730 does not necessarily follow immediately after step 720; usually, step 730 will occur at some later time later. In response to the place data request from a data-requesting application executing on the mobile device, the method entails determining (at step 740 if the data-requesting application has access to the place data for the place and (at step 750) providing the place data to the data-requesting application only if the data-requesting application has access. This novel place data management technology provides rules and permissions for granting access to the place data. In one embodiment, app-specific place data is accessible only by the owner application; group-specific place data is accessible only by the owner group; and platform-wide place data is accessible by all applications across the platform. This technology also provides platform-consistent UI's for place selection, the setting by user input of place data access permissions, the display of application-specific or group-specific place data, the display of public place data. The technology also provides a platform API that enables applications to set access permissions programmatically, i.e. without user input.

In one implementation, the step 710 of receiving input to specify which one or more applications on the mobile device are to have access to the place data for the place may be performed by receiving user input on a UI of the mobile device. A place may be displayed on the UI in any one of a plurality of different applications such as a mapping application, a navigation application, a traffic application, a travel application, a social networking application, a calendar application, an e-mail application, etc. Any application where location or place data may be presented to the user may be used to select that location or place as being the place to store, e.g. as a favourite place. These favourite places are stored as a common collection of places that are public to all applications. Regardless of the application that contributes a particular favourite place, the favourite place will be visible to other applications across the platform. Thus, in most embodiments, only a single instance of each favourite place is stored, accessible by all applications on the device.

Figure 19:
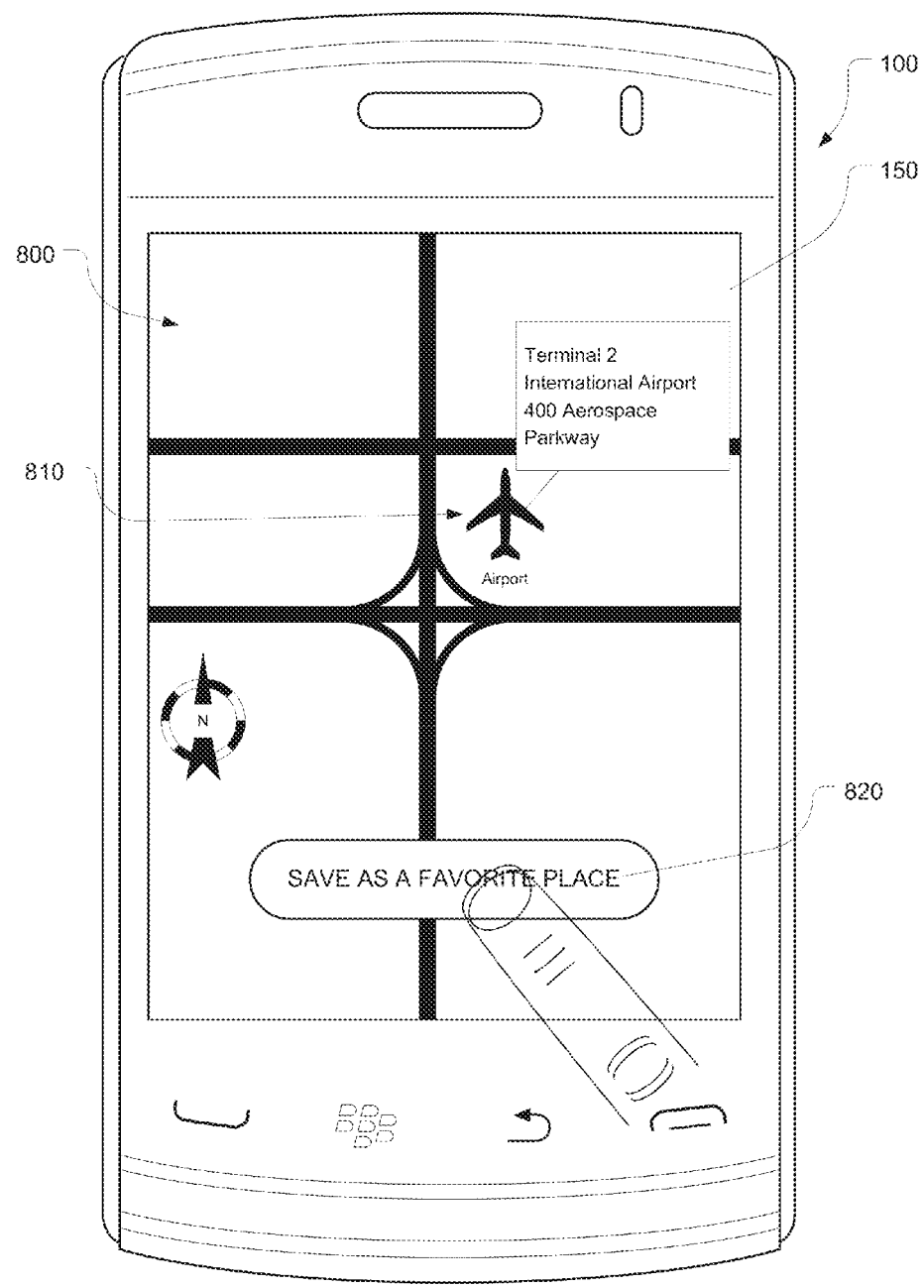
FIG. 19 depicts an example UI from which a place may be saved as a favourite place.

FIG. 19 depicts one example of the selecting of a place from within an application. FIG. 19 shows an exemplary mobile device 100 displaying a map 800 rendered on a display screen 150 by a mapping application. A POI, e.g. the international airport, is displayed and labelled with a callout or bubble. The POI 810 may be represented by a pushpin or other graphical indicator. A user interface element 820 is provided to enable the user to select and save the place as a favourite place. The mapping application is only one example of an application that originates the place data and which is used to receive the user selection of that place for storage.

Figure 20:
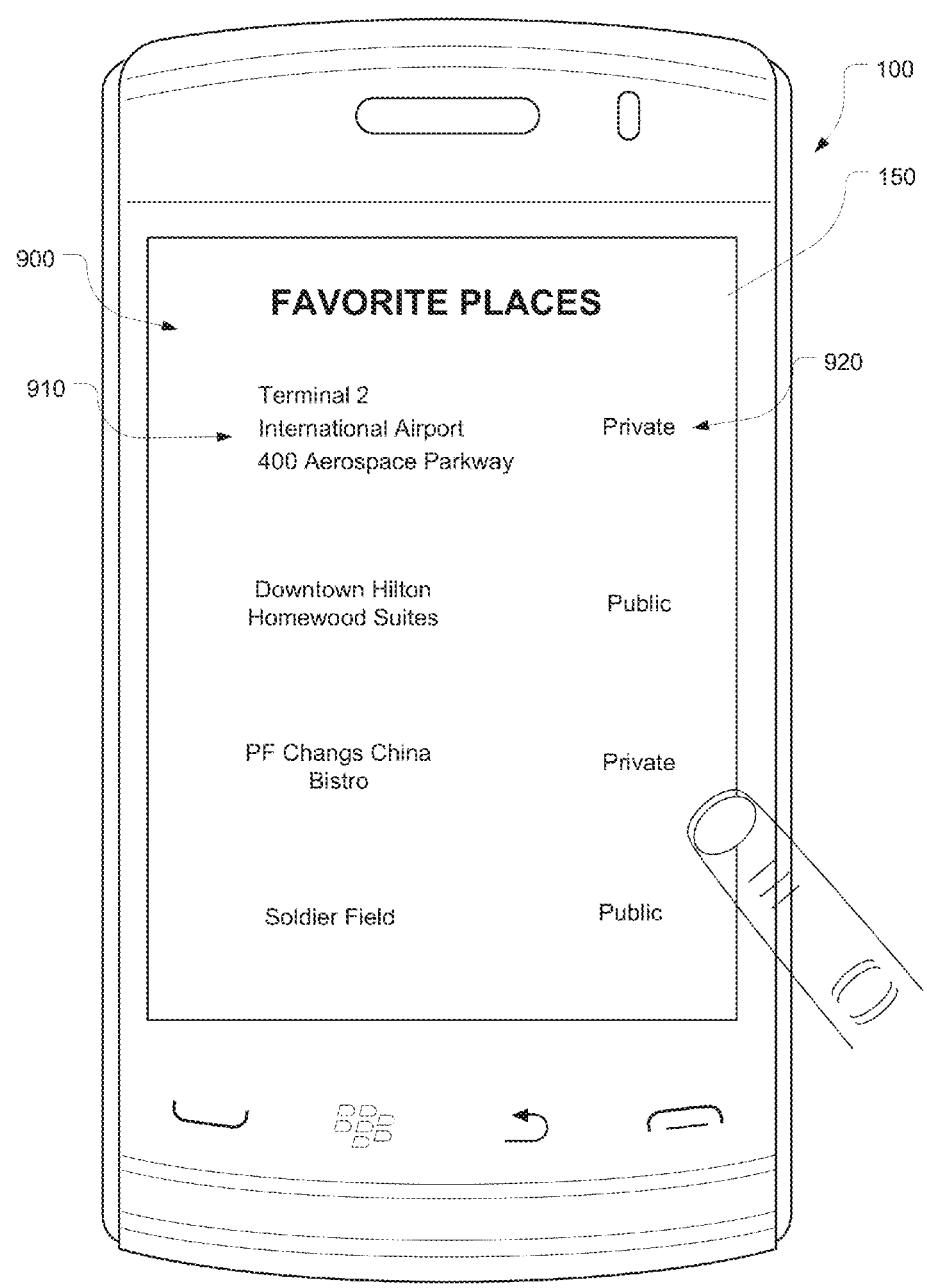
FIG. 20 depicts an example of a favourite places UI.

The place selected by the user may then be displayed in a list of favourite places such as the one shown by way of example in FIG. 20. The favourite place UI 900 of FIG. 20 may be displayed on a display 150 of a mobile device 100 in response to user input or it may be displayed automatically in response to saving a place as a favourite place. Each favourite place 910 may be listed in association with a privacy indicator 920 (which may be displayed as shown in FIG. 20) indicating whether the place is private or public. Place data access permission can be set either by the user or by the owner application programmatically. In one specific implementation, the place data of a private place is not shared with other applications and is thus only accessible by the application that was used to select the place. In this sense, private places will only be visible for selection, manipulation or interaction within the application that owns the private place data. Place data for public places, in contrast, are shared amongst all applications and are thus this data is accessible platform-wide. In other words, private place data is app-specific whereas public place data is platform-wide. In one embodiment, the device automatically determines whether the place data is private or public depending on the application that was used to create or obtain the place data. For example, in one embodiment, if the place data was created or obtained using a mapping application or a general place-selection application, then the setting is automatically public whereas any other application is automatically set as private. In other words, the mobile device automatically defines a data-sharing rule for the place data that automatically grants to the application that was used to select the place unlimited access to the place data without granting access to any other applications on the device. In one embodiment, the device may be configured to receive further user input to identify further applications that are also to have access to the place data.

Figure 21:
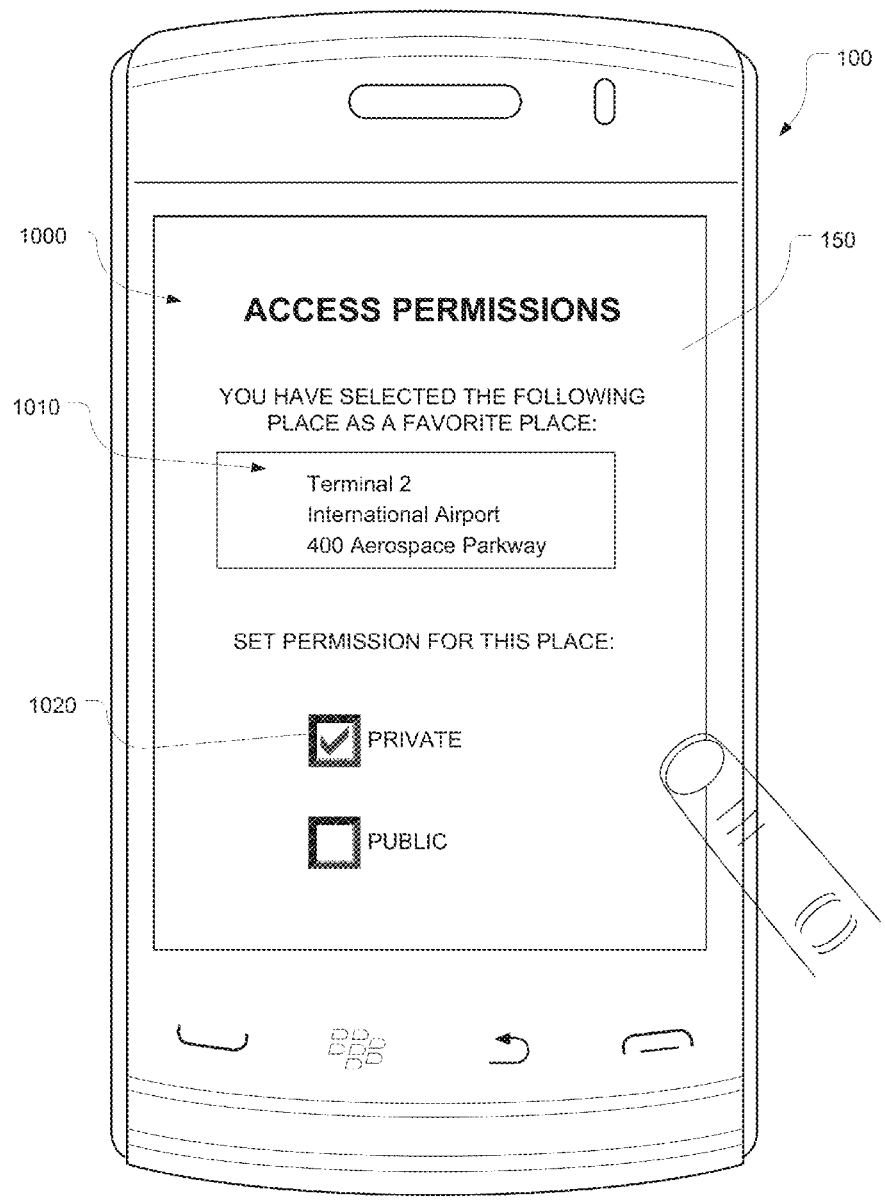
FIG. 21 depicts an example of a UI for setting access permissions.

Alternatively, the device may provide an access permission UI 1000 as shown by way of example in FIG. 21 that enables the user to set the access permission for a selected place as either private or public. The access permission UI 1000 may display the place in a place identification box 1010. A checkbox, toggle, radio button, or other suitable user interface element 1020 may be provided to enable the user to set the place as either private or public. The private and public settings may be configured by the user by accessing a settings or options page (not shown) which may be used to specify which applications have access to private place data and which only have access to public place data. Setting place data permissions can be done via user input as depicted in this figure or by the application using a place data permission-setting API. The application may be programmed to choose to make the selected place "visible" to other applications or not. When a place is selected (e.g. by using a place-selection UI (e.g. a "PlacePicker" UI, shown by way of example in FIG. 10B, the calling app can set the permission to have this new place added to the "Recent" list and thus be visible to other apps or not. FIG. 10B shows the three tabs "Favourites", "Recent" and "Contacts". Those are the public data that are visible to all apps. The application-specific places (private data) can be displayed in the fourth tab (not shown). The fourth tab would show only places data owned, for example, by a calendar app if the calendar app invokes the place-selection UI (PlacePicker UI). Similarly, it would show data owned by a messaging app if the messaging app invokes the place-selection UI (PlacePicker UI).

The simple private-public categorization is but one way of setting permissions in relation to place data stored in the centralized place data store. More sophisticated settings may be implemented, as will be described below, to enable the user to regulate with greater specificity which applications or groups of applications are to have access to the place data. Data accessibility entails a permission to, for example, read only, write (edit or update the place data), share the place data with another app on the device or send the place data to another device or to an app on another device. Accordingly, some place data is allowed to be readable by another app but may not be editable or sharable with a further app.

Figure 22:
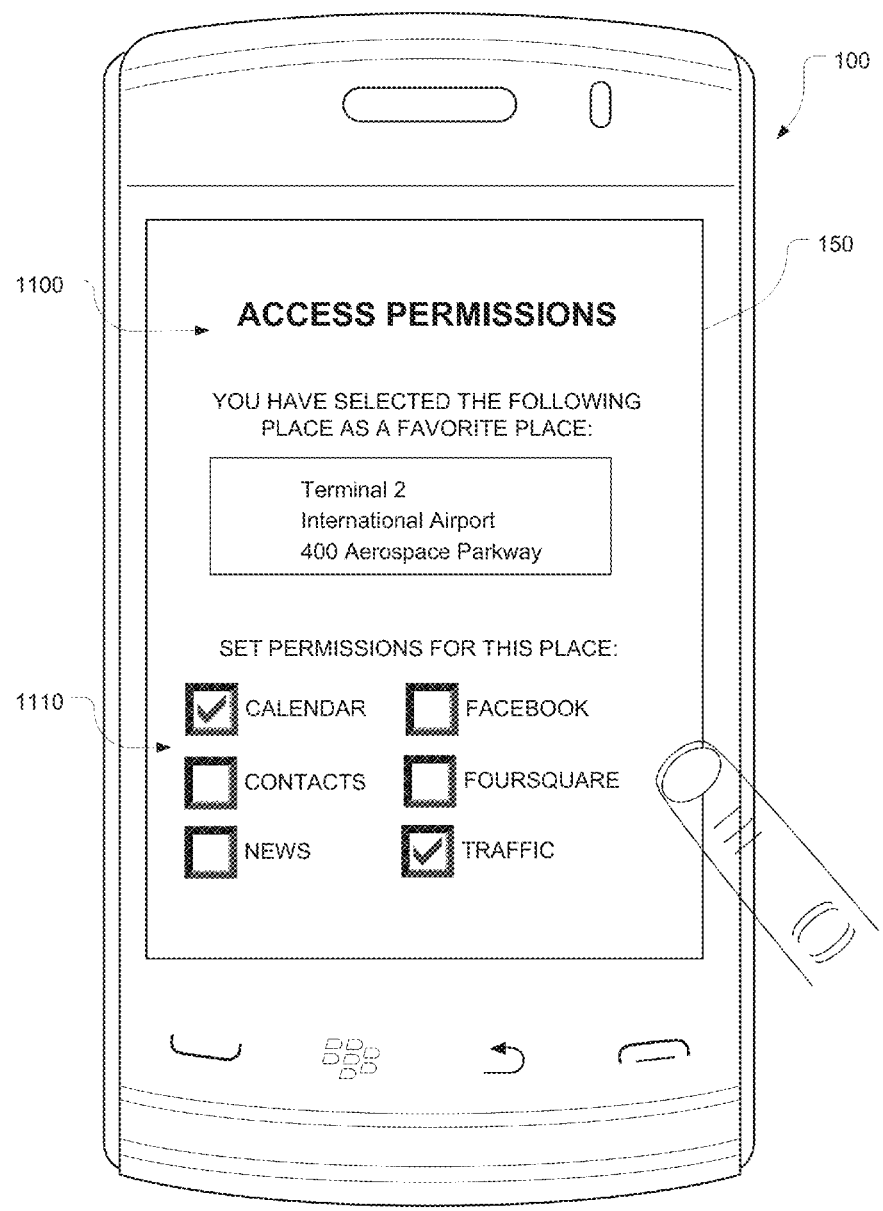
FIG. 22 depicts another example of a UI for setting access permissions on an app-by-app basis.

In one such implementation, as depicted in FIG. 22, the step 710 of receiving input to specify which one or more applications on the mobile device are to have access comprises receiving user input via an access control interface (an access permissions page) 1100 that presents a list of applications 1110 and one or more user interface elements for defining rules for each application on the list as to whether that application is to have access to the place data. The data-sharing rules (permissions) may be set by the user providing user input to the device or programmatically by the application itself (without user input or intervention). An example of such an interface is presented in FIG. 22. The UI of FIG. 22 lists the applications (calendar, contacts, news, Facebook, Foursquare and traffic) to enable the user to specify whether each of these applications is to have access to the place data or not. A simple check box system may be used as shown although any other UI may be utilized to enable configuring of the user selection. This selection by the user defines data-sharing rules or data filters that screen certain place data from certain applications. Data sharing rules can be set by the owner application in one implementation and by the Places Service (platform) in another implementation.

Figure 23:
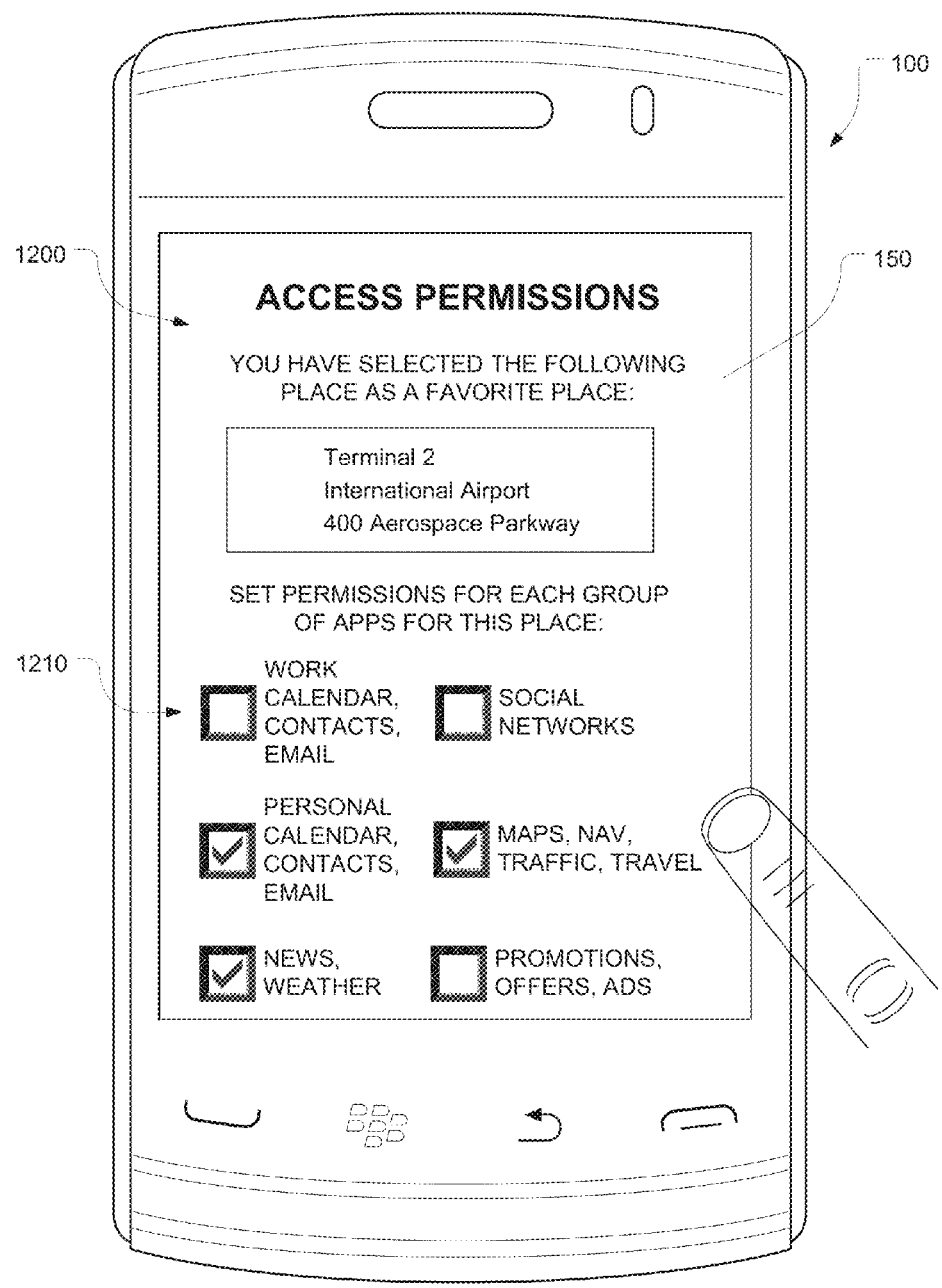
FIG. 23 depicts another example of a UI for setting access permissions for groups of apps.

In another implementation, the mobile device enables the user to define groups of applications to which the data-sharing rules apply. As depicted in the UI 1200 shown by way of example in FIG. 23, applications may be grouped together to simplify the process of defining the data-sharing rules. For example, an app group 1210 may be defined that includes all social network apps (Facebook, Foursquare, Twitter). Another app group may be defined that includes maps, navigation, travel and traffic. Another app group may be defined that relates to work calendar, work e-mail, work contacts whereas another may relate to personal calendar, personal e-mail, personal contacts. The user may then specify that a place and its place data may be shared among all applications in a predefined application group such as just among the social network applications, or just among the personal apps or just among the work apps. This ensures that private place data is not inadvertently shared with other applications. For example, work-related place data may be confidential and company policy might require that such data not be shared with personal or social network applications. Data-sharing rules may be defined also in terms of whether the application stores all of its data locally on the device or whether some or all of the application data is stored remotely on a server. The data-sharing rules (permissions) may be set by the user providing user input to the device or programmatically by the application itself (without user input or intervention).

In a variant of the app-grouping concept described above, the mobile device may be configured to automatically grant access to all other apps in the group when the place is selected using one of the apps in the group. Thus, for example, if a predefined group consists of the mapping, navigation, travel, and traffic apps, any place data created or obtained using for example the travel app becomes automatically accessible by the mapping, navigation and traffic apps. In other words, in this variant, selecting the place from within one of a predefined group of applications causes the device to define a data-sharing rule for the place data such that all applications within the group are automatically granted unlimited access to the place data.

Figure 24:
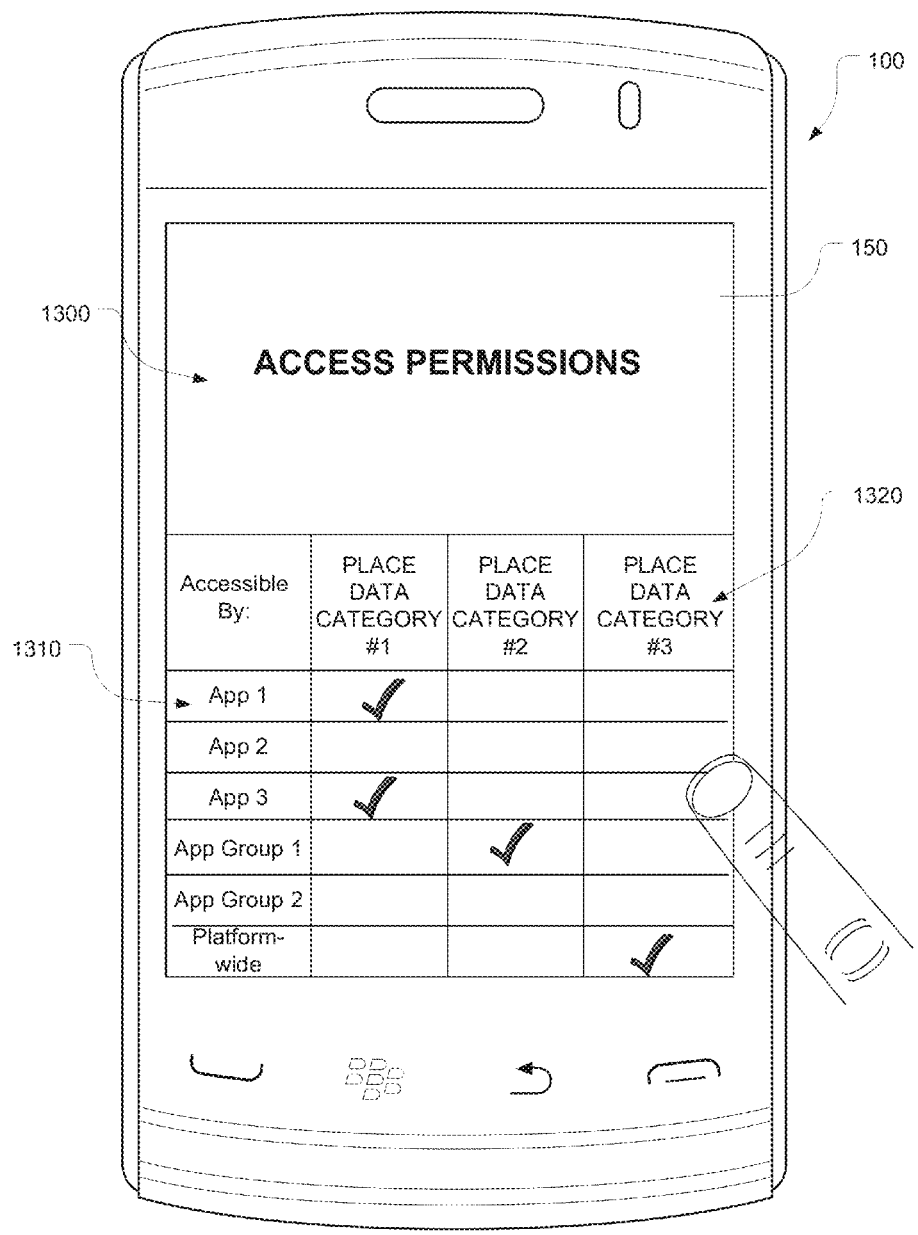
FIG. 24 depicts another example of a UI for setting access permissions for specific types or categories of place data for a plurality of favourite places.

In one implementation, the mobile device 100 enables the user to define data-sharing rules applicable only to specific types or categories of place data. A place can have multiple tags. Examples of tags are: favourite, contact, POI (point of interest). Tags can also be user-defined, i.e. assigned to the place when the place is created by that owner. Accordingly, a place having multiple tags belongs to multiple categories. Data access permissions may thus be set based on category, which means that only place data which belong to a particular category (i.e. that have the particular tag) are accessible by a particular app, by a group of apps or by all apps ("platform-wide"). Controlling and permitting access to specific types or categories of place data may be accomplished by receiving user input via an access permissions UI 1300 as depicted by way of example in FIG. 24. Alternatively, access permissions may be automatically set by the application without user input or user intervention. As shown in FIG. 24, the UI 1300 displays an array or matrix of rows and columns in which the user may determine which apps and groups of apps (denoted by reference numeral 1310) may access place data of a place based on whether that place comprises certain categories of place data, i.e. whether the place has certain data tags 1320. The categories (tags) may be represented conceptually as tag #1, tag #2, tag #3, etc. In the illustrated example, if the place comprises tag #1, then app 1 and app 3 may access the place data for the place. If the place comprises tag #2, then app group 1 may access the place data. If the place has tag #3, then the place is accessible to all apps and groups (the place is accessible platform-wide). Accessibility is thus based on category. In other implementations, the UI need not involve an array/matrix; checkboxes, menus, wizards or the like may be used to specify which apps have access to the place based on whether the place data has certain categories of place data, i.e. certain tags. The mobile device may thus enable the user to specify which applications have access to which places on the basis of data categories or data tags. Alternatively, the setting of data access permissions based on place category can also be done programmatically (automatically and without user input) by a service or application.

In a variant, the mobile device may enable the user to specify and limit how the place data is used by the other applications. For example, the device may limit the communication, publication, or export of data to a third party device or web server. The device may thus provide a set of internal use permissions and a set of external use permissions.

Figure 25:
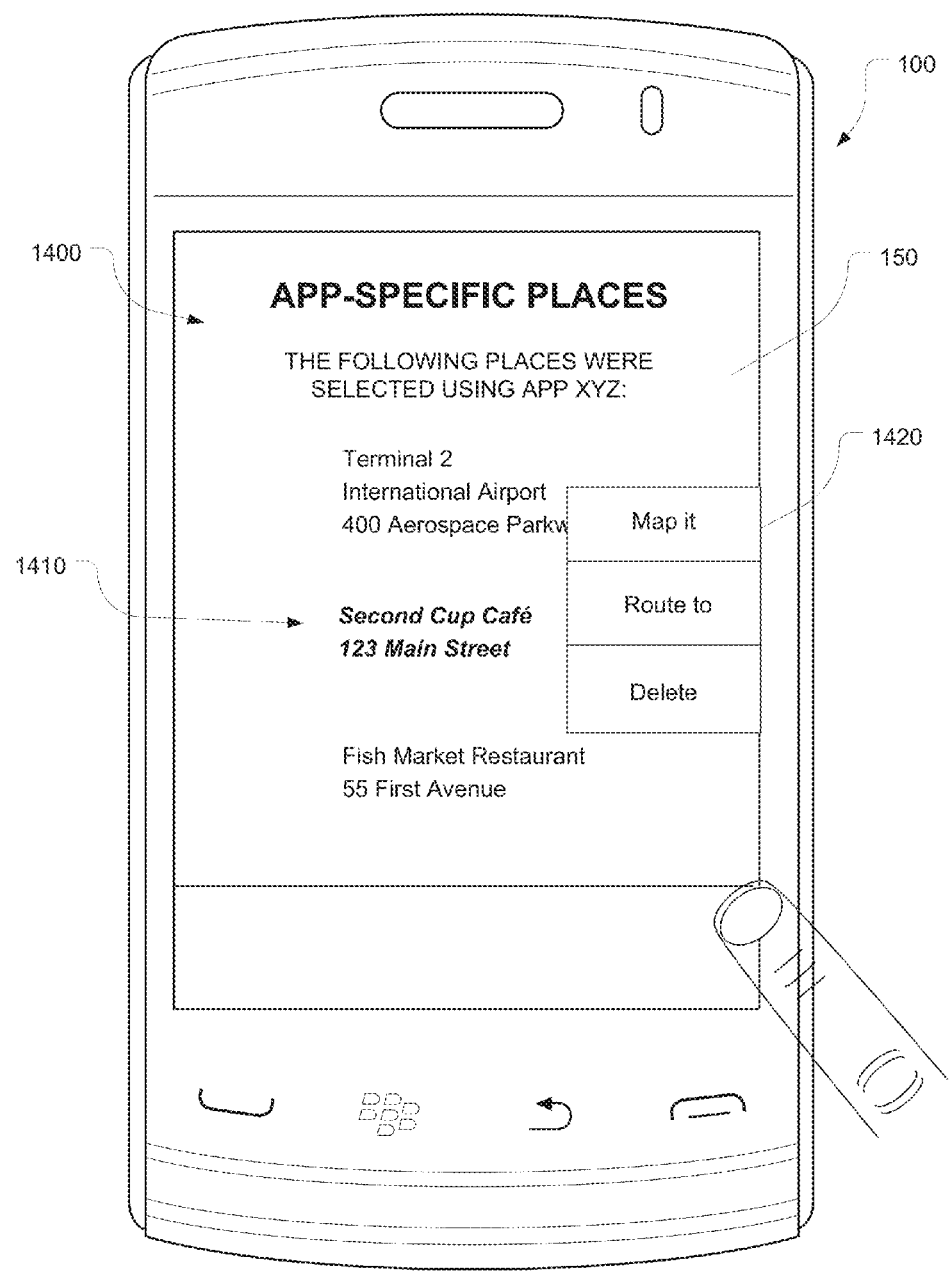
FIG. 25 depicts an example of a UI displaying app-specific places.

In accordance with another aspect of this technology, the mobile device 100 may also be configured to display an application-specific list of places that have been selected using that specific application. FIG. 25 displays an application-specific list 1410 of places that have been selected using a specific application. A menu 1420 may be displayable as shown in FIG. 25 to provide a plurality of actions that the user may wish to perform in relation to the place. For example, the actions may be to map the place, get route directions to the place, and delete the place. Other actions may be presented as will be appreciated. In this example, the place data is private to the application, and therefore the place data is not sharable with other applications on the device.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A method of managing place data for a mobile device, the method comprising:
 receiving input to select a place;
 receiving input to define one or more access permissions for a group of applications on the mobile device that determine access for each of the applications in the group to the place data for the place;
 storing the place data for the place in a centralized place database in a memory of the mobile device; and
 in response to a place data request from a data-requesting application executing on the mobile device:
 determining if the data-requesting application is part of the group that has been permitted access to the place data for the place; and
 providing the place data to the data-requesting application only if the data-requesting application is part of the group that has been permitted access to the place data.

2. The method as claimed in claim 1 further comprising receiving user input on a place-selection user interface that presents a list of applications and one or more user interface elements for defining rules for each application on the list as to whether that application is to have access to the place data.

3. The method as claimed in claim 1 wherein receiving input to specify the one or more permissions comprises:
 automatically, and without user input, defining a data-sharing rule for the place data by the application contributing the place data.

4. The method as claimed in claim 1 further comprising displaying an application-specific list of places that have been selected using the application contributing the place data.

5. The method as claimed in claim 1 further comprising displaying a list of public places accessible by all applications.

6. The method as claimed in claim 1 further comprising displaying a list of places that are accessible by the group of applications.

7. The method as claimed in claim 1 further comprising granting access to app-specific place data only to an owner application; granting access to group-specific place data only to an owner group; and granting access to platform-wide place data to all applications across the platform.

8. The method as claimed in claim 1 further comprising defining data-sharing rules applicable only to specific types of place data.

9. The method as claimed in claim 1 further comprising defining groups of applications to which common data-sharing rules apply.

10. A non-transitory computer-readable medium comprising instructions in code which when loaded into a memory and executed by a processor of a mobile device cause the mobile device to:
   receive input to select a place;
   receive input to define one or more access permissions for a group of applications on the mobile device that determine access for each of the applications in the group to the place data for the place;
   store the place data for the place in a centralized place database in a memory of the mobile device; and
   in response to a place data request from a data-requesting application executing on the mobile device:
      determine if the data-requesting application is part of the group that has been permitted access to the place data for the place; and
      provide the place data to the data-requesting application only if the data-requesting application is part of the group that has been permitted access.

11. The non-transitory computer-readable medium as claimed in claim 10 comprising code for receiving user input on a place-selection user interface that presents a list of applications and one or more user interface elements for defining rules for each application on the list as to whether that application is to have access to the place data.

12. The non-transitory computer-readable medium as claimed in claim 10 comprising code for:
   automatically defining a data-sharing rule for the place data that automatically grants access to the place data to the application contributing the place data and to any related applications that belong to a same group of applications.

13. The non-transitory computer-readable medium as claimed in claim 12 further comprising code for displaying an application-specific list of places that have been selected using the application contributing the place data.

14. The non-transitory computer-readable medium as claimed in claim 10 comprising code for: granting access to app-specific place data only to an owner application; granting access to group-specific place data only to an owner group; and granting access to platform-wide place data to all applications across the platform.

15. A mobile device comprising:
   a position-determining subsystem for determining a position of the mobile device;
   a user interface for receiving input to select a place and to define one or more access permissions for a group of applications on the mobile device that determine access for each of the applications of the group to the place data for the place;
   a memory for storing the place data for the place in a centralized place database; and
   a processor for processing a place data request from a data-requesting application executing on the mobile device by:
      determining if the data-requesting application is part of a group that has been permitted access to the place data for the place; and
      providing the place data to the data-requesting application only if the data-requesting application is part of the group that has been permitted access.

16. The mobile device as claimed in claim 15 further comprising a display for displaying a place-selection user interface that presents a list of applications and one or more user interface elements for defining rules for each application on the list as to whether each application is to have access to the place data.

17. The mobile device as claimed in claim 15 further comprising a display for displaying a list of application-specific places that only contains the places that have been selected by a specific application.

18. The mobile device as claimed in claim 17 wherein the processor is configured to cause the display, in response to user input, to display a user interface presenting user interface elements for viewing lists of favourite places, recent places, and application-specific places.

19. The mobile device as claimed in claim 15 wherein the processor identifies the application that has been used to select the place, defines a rule that the application that has been used to select the place has automatic access to the place data for the place, and further determines if the user has provided further input defining other data-sharing rules for accessing the place data by other applications on the mobile device.

20. The mobile device as claimed in claim 15 wherein access to the place data comprises permissions to read the place data, edit the place data, share the place data with another application on the device, or send the place data to another device.

* * * * *